(12) United States Patent
Badaroglu et al.

(10) Patent No.: US 12,340,304 B2
(45) Date of Patent: Jun. 24, 2025

(54) PARTIAL SUM MANAGEMENT AND RECONFIGURABLE SYSTOLIC FLOW ARCHITECTURES FOR IN-MEMORY COMPUTATION

(71) Applicant: QUALCOMM Incorporated, San Diego, CA (US)

(72) Inventors: Mustafa Badaroglu, Flemish Brabant (BE); Zhongze Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 989 days.

(21) Appl. No.: 17/398,791

(22) Filed: Aug. 10, 2021

(65) Prior Publication Data

US 2023/0047364 A1    Feb. 16, 2023

(51) Int. Cl.
| | |
|---|---|
| *G06N 3/063* | (2023.01) |
| *G06F 7/50* | (2006.01) |
| *G06F 7/523* | (2006.01) |
| *G06N 3/08* | (2023.01) |
| *G06F 7/544* | (2006.01) |

(52) U.S. Cl.
CPC ............. *G06N 3/08* (2013.01); *G06F 7/50* (2013.01); *G06F 7/523* (2013.01); *G06N 3/063* (2013.01); *G06F 7/5443* (2013.01)

(58) Field of Classification Search
CPC ........... G06N 3/06; G06N 3/063; G06N 3/065
See application file for complete search history.

(56) References Cited

U.S. PATENT DOCUMENTS

| | | | | |
|---|---|---|---|---|
| 10,949,380 | B2 * | 3/2021 | Nam ...................... | G06F 9/3001 |
| 11,494,627 | B1 * | 11/2022 | Li .......................... | G06N 3/063 |
| 2005/0219422 | A1 * | 10/2005 | Dorojevets ......... | G06F 15/8092 |
| | | | | 712/E9.046 |
| 2016/0132295 | A1 * | 5/2016 | Tinker .................. | G06F 7/5443 |
| | | | | 708/230 |
| 2020/0285605 | A1 * | 9/2020 | Nam ................... | G06F 15/8046 |

(Continued)

OTHER PUBLICATIONS

Chih Y-D., et al., "16.4 An 89TOPS/W and 16.3TOPS/mm2 All-Digital SRAM-Based Full-Precision Compute-In Memory Macro in 22nm for Machine-Learning Edge Applications," 2021 IEEE International Solid-State Circuits Conference (ISSCC), Session 16, Computation in Memory, Feb. 17, 2021, 3 pages.

(Continued)

*Primary Examiner* — Seokjin Kim
(74) *Attorney, Agent, or Firm* — QUALCOMM Incorporated

(57) ABSTRACT

Methods and apparatus for performing machine learning tasks, and in particular, to a neural-network-processing architecture and circuits for improved handling of partial accumulation results in weight-stationary operations, such as operations occurring in compute-in-memory (CIM) processing elements (PEs). One example PE circuit for machine learning generally includes an accumulator circuit, a flip-flop array having an input coupled to an output of the accumulator circuit, a write register, and a first multiplexer having a first input coupled to an output of the write register, having a second input coupled to an output of the flip-flop array, and having an output coupled to a first input of the first accumulator circuit.

13 Claims, 17 Drawing Sheets

(56) References Cited

U.S. PATENT DOCUMENTS

2020/0410337 A1\* 12/2020 Huang .................... G06N 3/04
2021/0117356 A1\*  4/2021 Pugh ................... G06F 15/7867
2024/0427729 A1\* 12/2024 Das Sarma ........... G06F 9/3889

OTHER PUBLICATIONS

Kang M., et al., "Deep In-Memory Architectures in SRAM: An Analog Approach to Approximate Computing," Proceedings of the IEEE, vol. 108, No. 12, Dec. 2020, pp. 2251-2275.
International Search Report and Written Opinion—PCT/US2022/074658—ISA/EPO—Nov. 29, 2022.

\* cited by examiner

1200 ⇨

Perform a MAC operation in each PE circuit in a set of cascaded PE circuits, wherein an output of a first PE circuit in the set is coupled to an input of a second PE circuit in the set and wherein each PE circuit in the set of cascaded PE circuits comprises: a MAC circuit, a local accumulator circuit having an input coupled to an output of the MAC circuit, and a set of flip-flops having an input coupled to an output of the local accumulator circuit ⸺ 1205

Perform a shifting operation with the set of flip-flops in each PE circuit to shift a value from the PE circuit to a next PE circuit in the set of cascaded PE circuits or to a global accumulator circuit, wherein in each PE circuit, the shifting operation is performed concurrently with the performance of the MAC operation ⸺ 1210

Accumulate, with the global accumulator circuit, the shifted values from a last PE circuit in the set of cascaded PE circuits to generate accumulated data ⸺ 1215

FIG. 12

PARTIAL SUM MANAGEMENT AND RECONFIGURABLE SYSTOLIC FLOW ARCHITECTURES FOR IN-MEMORY COMPUTATION

TECHNICAL FIELD

Aspects of the present disclosure relate to machine learning, and in particular, to circuits, neural-network-processing architectures, and techniques for handling partial sums in weight-stationary schemes, such as in compute-in-memory (CIM) technology.

BACKGROUND

Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

As the use of machine learning has proliferated for enabling various machine learning (or artificial intelligence) tasks, the desire for more efficient processing of machine learning model data has grown. In some cases, dedicated hardware, such as machine learning accelerators, may be used to enhance a processing system's capacity to process machine learning model data. However, such hardware demands space and power, which is not always available on the processing device. For example, "edge processing" devices, such as mobile devices, always-on devices, Internet of Things (IoT) devices, and the like, typically have to balance processing capabilities with power and packaging constraints. Further, accelerators may move data across common data busses, which can cause significant power usage and introduce latency into other processes sharing the data bus.

Consequently, other aspects of a processing system are being considered for processing machine learning model data. Memory devices are one example of another aspect of a processing system that may be leveraged for performing processing of machine learning model data through so-called compute-in-memory (CIM) processes, also referred to as in-memory computation.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure are directed to a processing element (PE) circuit for machine learning. The PE circuit generally includes a first accumulator circuit; a flip-flop array having an input coupled to an output of the first accumulator circuit; a write register; and a first multiplexer having a first input coupled to an output of the write register, having a second input coupled to an output of the flip-flop array, and having an output coupled to a first input of the first accumulator circuit.

Certain aspects of the present disclosure are directed to a neural network circuit comprising a plurality of PE circuits, wherein at least one of the plurality of PE circuits comprises the PE circuit as described herein. The neural network circuit further includes a tightly coupled memory coupled to the write bus and to the read bus and a global memory coupled to the read bus, wherein another one of the plurality of PE circuits has an output coupled to a second input of the first accumulator circuit.

Certain aspects of the present disclosure are directed to a neural network circuit. The neural network circuit generally includes a first set of cascaded PE circuits, wherein an output of a first PE circuit in the first set is coupled to an input of a second PE circuit in the first set and a first global accumulator circuit having an input coupled to an output of the first set of cascaded PE circuits. Each PE circuit in the first set of cascaded PE circuits includes a multiply-and-accumulate (MAC) circuit, a local accumulator circuit having an input coupled to an output of the MAC circuit, and a set of flip-flops having an input coupled to an output of the local accumulator circuit.

Certain aspects of the present disclosure are directed to a method of neural network processing. The method generally includes receiving, at a first input of a multiplexer, first data from a write register; receiving, at a second input of the multiplexer, second data from a flip-flop array; receiving, at an accumulator circuit, third data from a PE circuit; selecting, with the multiplexer, data to output to the accumulator circuit between the first data and the second data; and accumulating, with the accumulator circuit, the selected output data from the multiplexer and the third data received from the PE circuit to generate accumulated data.

Certain aspects of the present disclosure are directed to a method of neural network processing. The method generally includes performing a MAC operation in each PE circuit in a set of cascaded PE circuits, wherein an output of a first PE circuit in the set of cascaded PE circuits is coupled to an input of a second PE circuit in the set of cascaded PE circuits and wherein each PE circuit in the set of cascaded PE circuits comprises: a MAC circuit, a local accumulator circuit having an input coupled to an output of the MAC circuit, and a set of flip-flops having an input coupled to an output of the local accumulator circuit; performing a shifting operation with the set of flip-flops in each PE circuit to shift a value from the PE circuit to a next PE circuit in the set of cascaded PE circuits or to a global accumulator circuit, wherein in each PE circuit, the shifting operation is performed concurrently with the performance of the MAC operation; and accumulating, with the global accumulator circuit, the shifted values from a last PE circuit in the set of cascaded PE circuits to generate accumulated data.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 12 is a flow diagram illustrating example operations for neural network processing, in accordance with certain aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
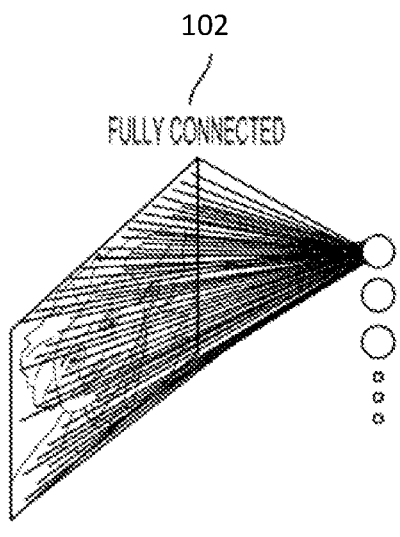
FIGS. 1A-1D depict examples of various types of neural networks, which may be implemented by aspects of the present disclosure.

Aspects of the present disclosure provide apparatuses, methods, processing systems, and computer-readable mediums for performing data-intensive processing, such as implementing machine learning models. Some aspects provide a neural-network-processing architecture and circuits for improved handling of partial accumulation results in weight-stationary operations, such as operations occurring in compute-in-memory (CIM) processing elements (PEs).

Brief Introduction to Neural Networks, Deep Neural Networks, and Deep Learning

Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher-level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks (DNNs), may be designed with a variety of connectivity patterns between layers.

FIG. 1A illustrates an example of a fully connected neural network 102. In a fully connected neural network 102, each node in a first layer communicates its output to every node in a second layer, so that each node in the second layer will receive input from every node in the first layer.

Figure 1B:
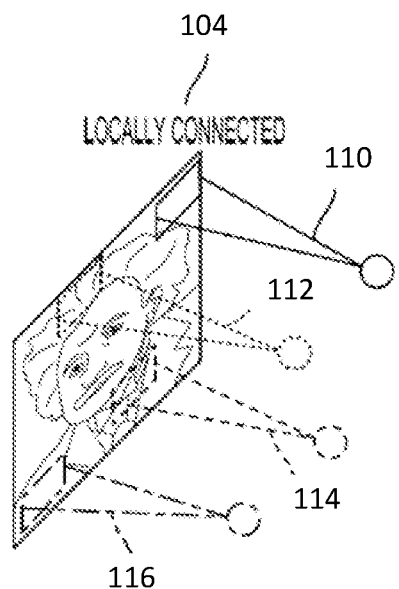

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connection strengths (or weights) that may have different values (e.g., values associated with local areas 110, 112, 114, and 116 of the first layer nodes). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
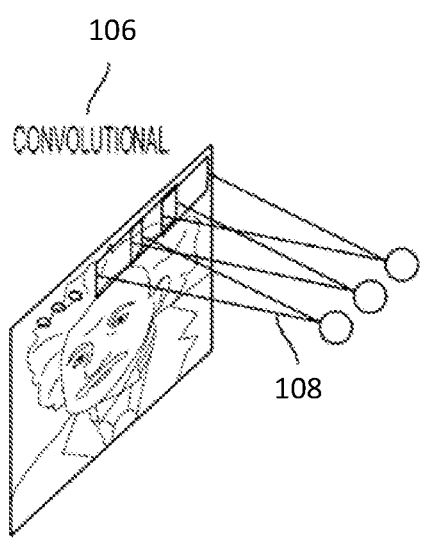

One type of locally connected neural network is a convolutional neural network (CNN). FIG. 1C illustrates an example of a convolutional neural network 106. The convolutional neural network 106 may be configured such that the connection strengths associated with the inputs for each node in the second layer are shared (e.g., for local area 108 overlapping another local area of the first layer nodes). Convolutional neural networks are well suited to problems in which the spatial locations of inputs are meaningful.

One type of convolutional neural network is a deep convolutional network (DCN). Deep convolutional networks are networks of multiple convolutional layers, which may further be configured with, for example, pooling and normalization layers.

Figure 1D:
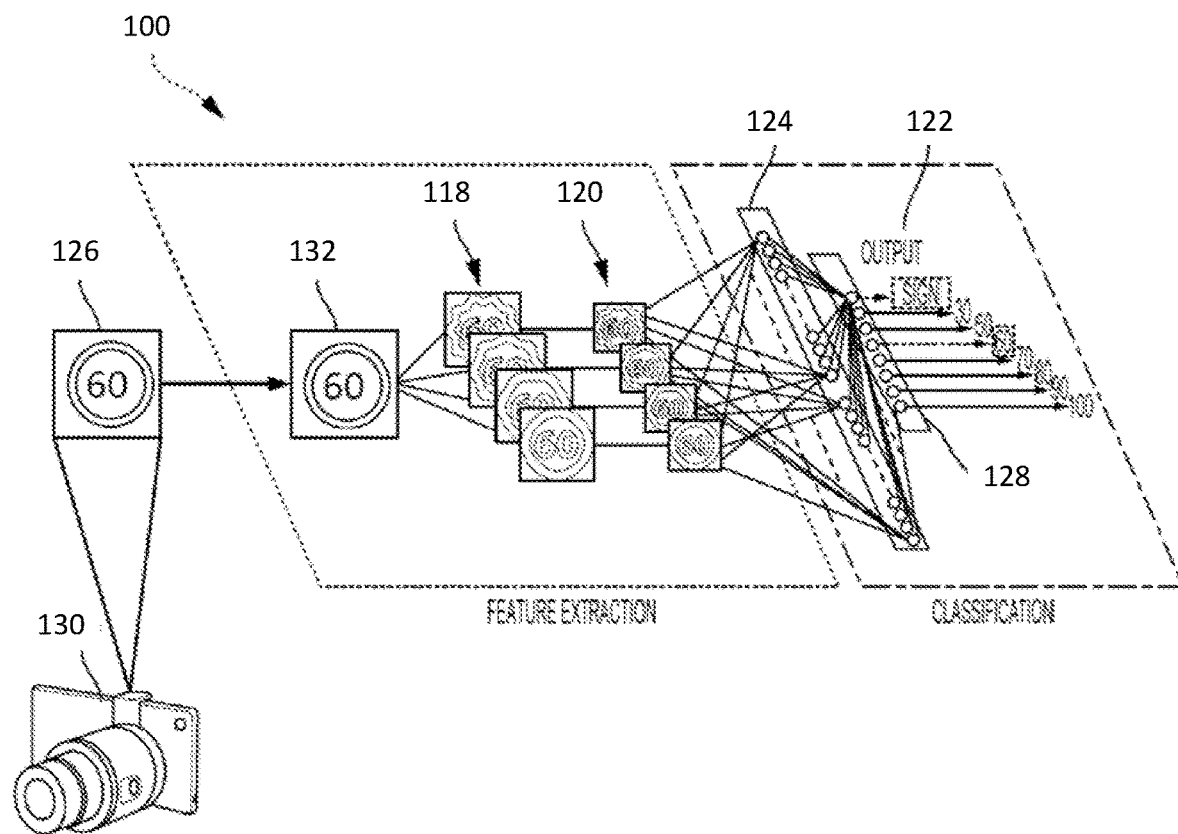

FIG. 1D illustrates an example of a DCN 100 designed to recognize visual features in an image 126 generated by an image-capturing device 130. For example, if the image-capturing device 130 is a camera mounted in or on (or otherwise moving along with) a vehicle, then the DCN 100 may be trained with various supervised learning techniques to identify a traffic sign and even a number on the traffic sign. The DCN 100 may likewise be trained for other tasks, such as identifying lane markings or identifying traffic lights. These are just some example tasks, and many others are possible.

In the example of FIG. 1D, the DCN 100 includes a feature-extraction section and a classification section. Upon receiving the image 126, a convolutional layer 132 applies convolutional kernels (for example, as depicted and described in FIG. 2) to the image 126 to generate a first set of feature maps (or intermediate activations) 118. Generally, a "kernel" or "filter" comprises a multidimensional array of weights designed to emphasize different aspects of an input data channel. In various examples, "kernel" and "filter" may be used interchangeably to refer to sets of weights applied in a convolutional neural network.

The first set of feature maps 118 may then be subsampled by a pooling layer (e.g., a max pooling layer, not shown) to generate a second set of feature maps 120. The pooling layer may reduce the size of the first set of feature maps 118 while maintaining much of the information in order to improve model performance. For example, the second set of feature maps 120 may be downsampled to a 14×14 matrix from a 28×28 matrix by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is provided to a fully connected layer 124, which in turn generates an output feature vector 128. Each feature of the output feature vector 128 may include a number that corresponds to a possible feature of the image 126, such as "sign," "60," and "100." In some cases, a softmax function (not shown) may convert the numbers in the output feature vector 128 to a probability. In such cases, an output 122 of the DCN 100 is a probability of the image 126 including one or more features.

A softmax function (not shown) may convert the individual elements of the output feature vector 128 into a probability in order that an output 122 of DCN 100 is one or more probabilities of the image 126 including one or more features, such as a sign with the number "60" thereon, as in image 126. Thus, in the present example, the probabilities in the output 122 for "sign" and "60" should be higher than the probabilities of the other elements of the output 122, such as "30," "40," "50," "70," "80," "90," and "100."

Before training the DCN 100, the output 122 produced by the DCN 100 may be incorrect. Thus, an error may be calculated between the output 122 and a target output known a priori. For example, here the target output is an indication that the image 126 includes a "sign" and the number "60." Utilizing the known target output, the weights of the DCN 100 may then be adjusted through training so that a subsequent output 122 of the DCN 100 achieves the target output (with high probabilities).

To adjust the weights of the DCN 100, a learning algorithm may compute a gradient vector for the weights. The gradient vector may indicate an amount that an error would increase or decrease if a weight were adjusted in a particular way. The weights may then be adjusted to reduce the error. This manner of adjusting the weights may be referred to as "backpropagation" because this adjustment process involves a "backward pass" through the layers of the DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, the DCN 100 may be presented with new images, and the DCN 100 may generate inferences, such as classifications, or probabilities of various features being in the new image.

Convolution Techniques for Convolutional Neural Networks

Convolution is generally used to extract useful features from an input data set. For example, in convolutional neural networks, such as described above, convolution enables the extraction of different features using kernels and/or filters whose weights are automatically learned during training. The extracted features are then combined to make inferences.

An activation function may be applied before and/or after each layer of a convolutional neural network. Activation functions are generally mathematical functions that determine the output of a node of a neural network. Thus, the activation function determines whether a node should pass information or not, based on whether the node's input is relevant to the model's prediction. In one example, where y=conv(x) (i.e., y is the convolution of x), both x and y may be generally considered as "activations." However, in terms of a particular convolution operation, x may also be referred to as "pre-activations" or "input activations" as x exists before the particular convolution, and y may be referred to as output activations or a feature map.

Figure 2:
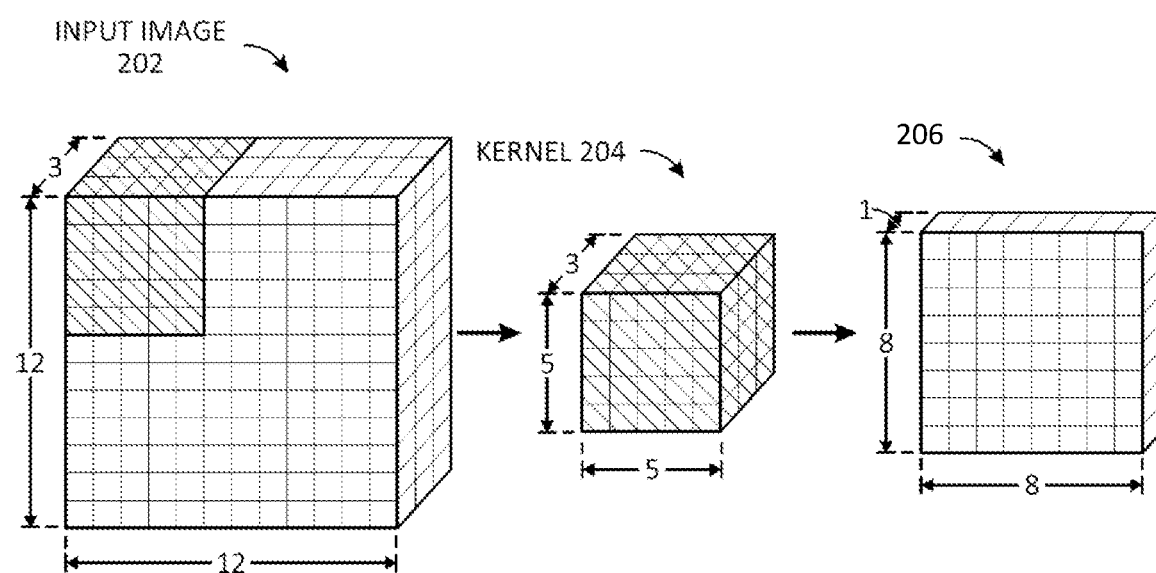
FIG. 2 depicts an example of a traditional convolution operation, which may be implemented by aspects of the present disclosure.

FIG. 2 depicts an example of a traditional convolution in which a 12-pixel×12-pixel×3-channel input image 202 is convolved using a 5×5×3 convolution kernel 204 and a stride (or step size) of 1. The resulting feature map 206 is 8 pixels×8 pixels×1 channel. As seen in this example, the traditional convolution may change the dimensionality of the input data as compared to the output data (here, from 12×12 to 8×8 pixels), including the channel dimensionality (here, from 3 channels to 1 channel). The convolution kernel 204 is shown as corresponding to a portion of the input image 202 with which the kernel is convolved to generate a single element of the feature map 206. Generally, as in this example, the depth (d=3) of the kernel 204 matches the number of channels of the input image 202.

Figure 3A:
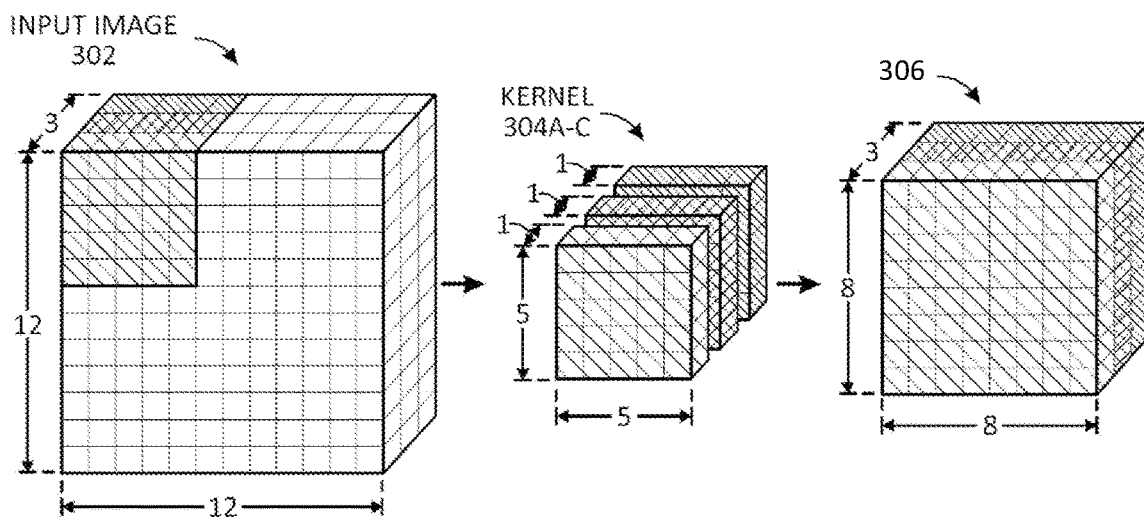
FIGS. 3A and 3B depict examples of depthwise separable convolution operations, which may be implemented by aspects of the present disclosure.
Figure 3B:
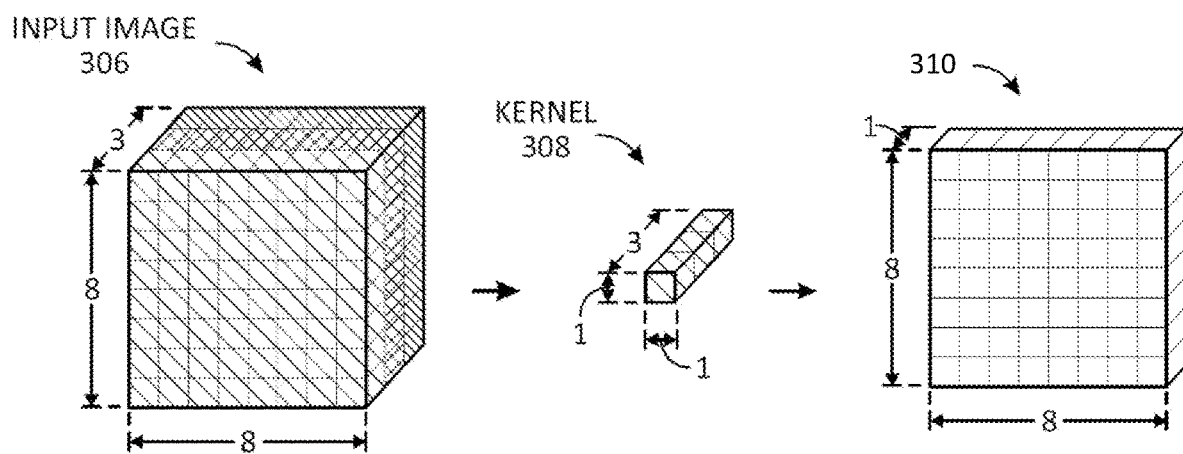

One way to reduce the computational burden (e.g., measured in floating-point operations per second (FLOPs)) and the number of parameters associated with a neural network comprising convolutional layers is to factorize the convolutional layers. For example, a spatial separable convolution, such as depicted in FIG. 2, may be factorized into two components: (1) a depthwise convolution, where each spatial channel is convolved independently by a depthwise convolution (e.g., a spatial fusion); and (2) a pointwise convolution, where all the spatial channels are linearly combined (e.g., a channel fusion). An example of a depthwise separable convolution is depicted in FIGS. 3A and 3B. Generally, during spatial fusion, a network learns features from the spatial planes, and during channel fusion, the network learns relations between these features across channels.

In one example, a depthwise separable convolution may be implemented using 5×5 kernels for spatial fusion, and 1×1 kernels for channel fusion. In particular, the channel fusion may use a 1×1×d kernel that iterates through every single point in an input image of depth d, where the depth d of the kernel generally matches the number of channels of the input image. Channel fusion via pointwise convolution is useful for dimensionality reduction for efficient computations. Applying 1×1×d kernels and adding an activation layer after the kernel may give a network added depth, which may increase the network's performance.

In particular, in FIG. 3A, the 12-pixel×12-pixel×3-channel input image 302 is convolved with a filter comprising three separate kernels 304A-C, each having a 5×5×1 dimensionality, to generate a feature map 306 of 8 pixels×8 pixels×3 channels, where each channel is generated by an individual kernel among the kernels 304A-C with the corresponding shading in FIG. 3A. Each convolution kernel 304A-C is shown as corresponding to a portion of the input image 302 with which the kernel is convolved to generate a single element of the feature map 306. The combined depth (d=3) of the kernels 304A-C here matches the number of channels of the input image 302.

Then, feature map 306 is further convolved using a pointwise convolution operation with a kernel 308 having dimensionality 1×1×3 to generate a feature map 310 of 8 pixels×8 pixels×1 channel. As is depicted in this example, feature map 310 has reduced dimensionality (1 channel versus 3 channels), which allows for more efficient computations therewith.

Though the result of the depthwise separable convolution in FIGS. 3A and 3B is substantially similar to the traditional convolution in FIG. 2, the number of computations is significantly reduced, and thus depthwise separable convolution offers a significant efficiency gain where a network design allows it.

Though not depicted in FIG. 3B, multiple (e.g., m) pointwise convolution kernels 308 (e.g., individual components of a filter) can be used to increase the channel dimensionality of the convolution output. So, for example, m=256 1×1×3 kernels 308 can be generated, in which each output is an 8-pixel×8-pixel×1-channel feature map (e.g., feature map 310), and these feature maps can be stacked to get a resulting feature map of 8 pixels×8 pixels×256 channels. The resulting increase in channel dimensionality provides more parameters for training, which may improve a convolutional neural network's ability to identify features (e.g., in input image 302).

Example Compute-in-Memory (CIM) Architecture

CIM-based machine learning (ML)/artificial intelligence (AI) may be used for a wide variety of tasks, including image and audio processing and making wireless communication decisions (e.g., to optimize, or at least increase, throughput and signal quality). Further, CIM may be based on various types of memory architectures, such as dynamic random-access memory (DRAM), static random-access memory (SRAM) (e.g., based on an SRAM cell as in FIG. 5), magnetoresistive random-access memory (MRAM), and resistive random-access memory (ReRAM or RRAM), and may be attached to various types of processing units, including central processing units (CPUs), digital signal processors (DSPs), graphics processing units (GPUs), field-programmable gate arrays (FPGAs), AI accelerators, and others. Generally, CIM may beneficially reduce the "memory wall" problem, which is where the movement of data in and out of memory consumes more power than the computation of the data. Thus, by performing the computation in memory, significant power savings may be realized. This is particularly useful for various types of electronic devices, such as lower power edge processing devices, mobile devices, and the like.

For example, a mobile device may include a memory device configured for storing data and performing CIM operations. The mobile device may be configured to perform an ML/AI operation based on data generated by the mobile device, such as image data generated by a camera sensor of the mobile device. A memory controller unit (MCU) of the mobile device may thus load weights from another on-board memory (e.g., flash or RAM) into a CIM array of the memory device and allocate input feature buffers and output (e.g., output activation) buffers. The processing device may then commence processing of the image data by loading, for example, a layer in the input buffer and processing the layer with weights loaded into the CIM array. This processing may be repeated for each layer of the image data, and the outputs (e.g., output activations) may be stored in the output buffers and then used by the mobile device for an ML/AI task, such as facial recognition.

As described above, conventional CIM processes may perform computation using analog signals, which may result in inaccuracies in the computation results, adversely impacting neural network computations. One emerging solution for analog CIM schemes is digital compute-in-memory (DCIM) schemes, in which computations are performed using digital signals. As used herein, the term "CIM" may refer to either or both analog CIM and digital CIM, unless it is clear from context that only analog CIM or only digital CIM is meant.

Figure 4:
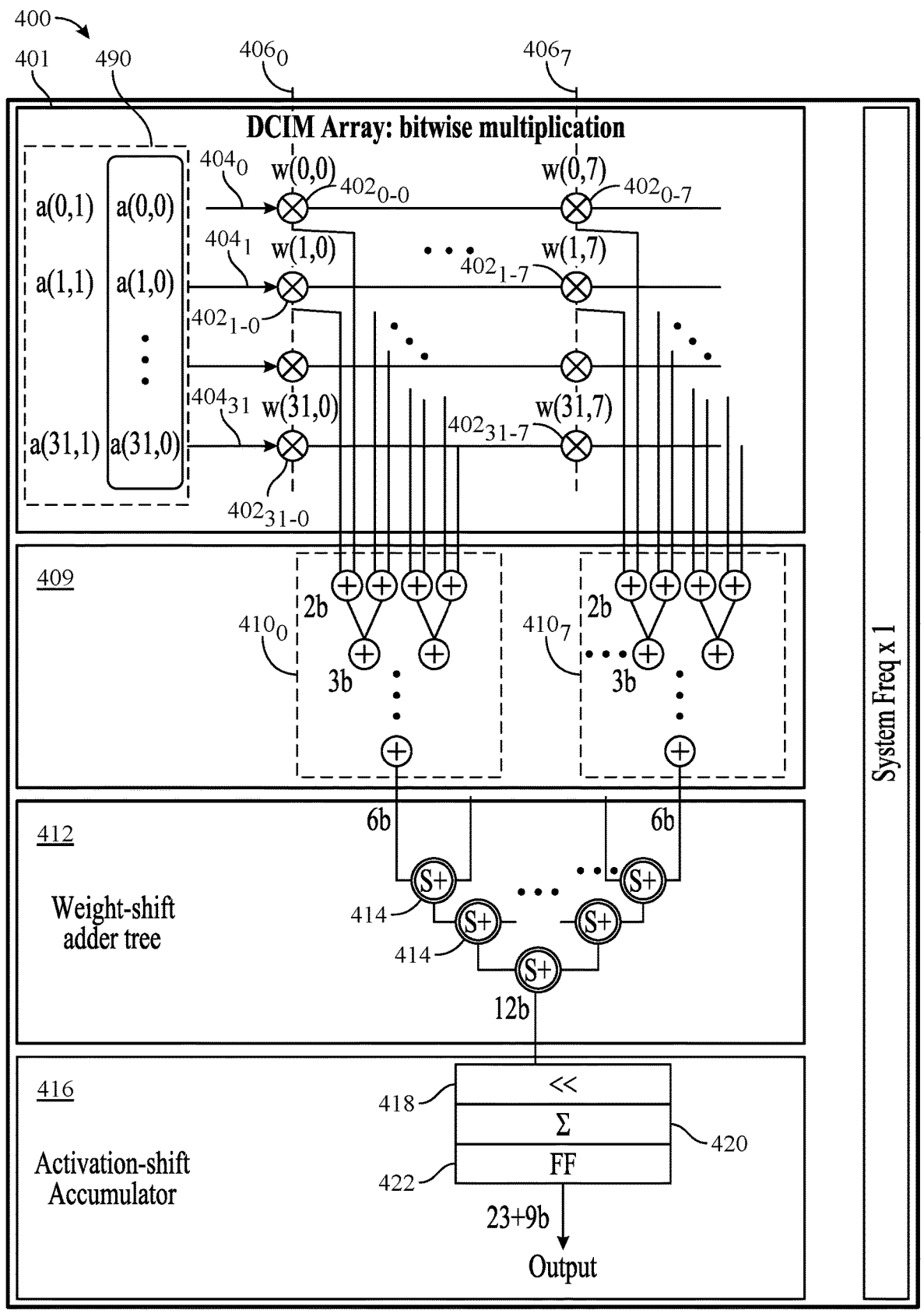
FIG. 4 is a block diagram of an example digital compute-in-memory (DCIM) architecture, in accordance with certain aspects of the present disclosure.

FIG. 4 is a block diagram of an example DCIM circuit 400, in accordance with certain aspects of the present disclosure. In a neural network architecture comprising multiple processing elements, the DCIM circuit 400 may function as a single DCIM processing element (PE).

In the example of FIG. 4, the DCIM circuit 400 includes a CIM array 401 (e.g., a DCIM array) having thirty-two word-lines $404_0$ to $404_{31}$ (also referred to as rows) and eight columns $406_0$ to $406_7$ (e.g., each column may be composed of multiple bit-lines, such as thirty-two bit-lines). Word-lines $404_0$ to $404_{31}$ are collectively referred to as "word-lines (WLs) 404," and columns $406_0$ to $406_7$ are collectively referred to as "columns 406." While the CIM array 401 is implemented with 32 word-lines and 8 columns to facilitate understanding, the CIM array may be implemented with any number of word-lines and with any number of columns. As shown, CIM cells $402_{0\text{-}0}$ to $402_{31\text{-}7}$ (collectively referred to as "CIM cells 402") are implemented at the intersections of the WLs 404 and columns 406.

Each of the CIM cells 402 may be implemented using the CIM cell architecture described below with respect to FIG. 5, for example.

The CIM cells 402 may be loaded with the weight bits of a neural network. The activation inputs may be provided as an input matrix (e.g., a 32-row by 8-column matrix) to the CIM array 401, one vector at a time. As shown in FIG. 4, activation input bits a(0,0) to a(31,0) (e.g., a first vector) may be provided to respective word-lines 404, and the CIM cells 402 may store weights w(0,0) to w(31,7) of the neural network, for example. In this case, CIM cells $402_{0\text{-}0}$ to $402_{0\text{-}7}$ may store weight bits w(0,0) to w(0,7), CIM cells $402_{1\text{-}0}$ to $402_{1\text{-}7}$ may store weight bits w(1,0) to w(1,7), and so on. Each word-line may store a multi-bit weight. For example, weight bits w(0,0) to w(0,7) may represent eight bits of a weight of a neural network (e.g., an 8-bit weight). Each CIM cell may perform bit-wise multiplication of a received activation input bit with the weight bit stored in the CIM cell and pass the result to the output of the CIM cell (e.g., the read bit-line (RBL), as explained with respect to FIG. 5).

As shown, the DCIM circuit 400 may include a bit-column adder tree 409, which may include eight adder trees $410_0$ to $410_7$ (collectively referred to as "adder trees 410"), each adder tree being implemented for a respective one of the columns 406. Each of the adder trees 410 adds the output signals from the CIM cells 402 on the respective one of the columns 406, and the adder trees 410 may operate in parallel (e.g., concurrently). The outputs of the adder trees 410 may be coupled to a weight-shift adder tree circuit 412, as shown. The weight-shift adder tree circuit 412 includes multiple weight-shift adders 414, each including a bit-shift-and-add circuit to facilitate the performance of a bit-shifting-and-addition operation. In other words, the CIM cells on column $406_0$ may store the most-significant bits (MSBs) for respective weights on each word-line 404, and the CIM cells on column $406_7$ may store the least-significant bits (LSBs) for respective weights on each word-line. Therefore, when performing addition across the columns 406, a bit-shift operation is performed to shift the bits to account for the significance of the bits on the associated column.

The output of the weight-shift adder tree circuit 412 is provided to an activation-shift accumulator circuit 416. The activation-shift accumulator circuit 416 includes a bit-shift circuit 418, a serial accumulator 420, and a flip-flop (FF) array 422. For example, the FF array 422 may be used to implement a register.

For certain aspects, the various elements of the DCIM circuit 400 of FIG. 4 may be operated with a common clock frequency (as indicated by the label "System Frequency× 1").

During operation of the DCIM circuit 400, activation circuitry 490 provides a first set of activation input bits a(0,0) to a(31,0) (e.g., a first vector in a batch of thirty-two activation input features) to the CIM cells 402 for computation during a first activation cycle. The first set of activation input bits a(0,0) to a(31,0) may represent the most-significant bits of the activation inputs. The outputs of computations on each column are added using a respective one of the adder trees 410. The outputs of the adder trees 410 are added using the weight-shift adder tree circuit 412, the results of which are provided to the activation-shift accumulator circuit 416. The same operation is performed for other sets of activation input bits (other input vectors in the batch) during subsequent activation cycles, such as activation input bits a(0,1) to a(31,1) (e.g., a second vector) that may represent the second most-significant bits of the activation inputs, and so on until activation input bits representing the least-significant bits of the activation inputs are processed. The bit-shift circuit 418 performs a bit-shift operation based on the activation cycle. For example, for an 8-bit activation input processed using eight activation cycles, the bit-shift circuit 418 may perform an 8-bit shift for the first activation cycle, a 7-bit shift for the second activation cycle, and so on. After the activation cycles, the outputs of the bit-shift circuit 418 are accumulated using the serial accumulator 420 and stored in the FF array 422, which may be used as a register to transfer the final accumulation result to another component (e.g., an output TCM or another DCIM circuit, such as in a systolic flow architecture as described below).

The DCIM circuit 400 of FIG. 4 provides bit-wise storage and bit-wise multiplication. The adder trees 410 perform a population count addition for the columns 406. That is, each of the adder trees 410 adds the output signals of the CIM cells for a column (e.g., adding all 32 rows per column). The weight-shift adder tree circuit 412 (e.g. having three stages as shown for eight columns) combines the weighted sum generated for the eight columns (e.g., providing the accumulation result for a given activation input bit position during an activation cycle). The activation-shift accumulator circuit 416 combines the results from multiple (e.g., eight) activation cycles and outputs the final accumulation result. For example, the bit-shift circuit 418 shifts the bits at the output of the weight-shift adder tree circuit 412 based on the associated activation cycle. The serial accumulator 420 accumulates the shifted adder output generated by the bit-shift circuit 418. The transfer register implemented using the FF array 422 copies the output of the serial accumulator 420 after the computation for the last activation cycle has been completed.

The DCIM circuit 400 provides linear energy scaling across computations using different bit-sizes of activation inputs and/or weights. In other words, using the adder trees 410 and weight-shift adder tree circuit 412 provides bit-size configurability, allowing for an n-bit activation input with an m-bit weight accumulation, n and m being positive integers. The energy consumption associated with the DCIM circuit 400 may scale linearly based on the configured bit-size for the activation inputs and weights.

The example DCIM circuit 400 of FIG. 4 may be comparatively compact (in terms of area occupied) and may consume relatively low energy. However, the DCIM circuit 400 and the "pseudo-weight-stationary mapping" used therein may have some challenges with partial sum accumulation, which are discussed below. As used herein, a "pseudo-weight-stationary mapping" generally refers to a weight-stationary re-use scheme that processes a batch of input features for each of multiple depth-cycles, in an effort to generate the final outputs as quickly as possible. For example, the DCIM circuit 400 enables a pseudo-weight-stationary scheme, where a batch of 32 activation input features may be concurrently processed. A smaller batch size (e.g., 32 versus 256 features) allows the final output result to be generated more quickly, since the total number of cycles to finish running through the depth-cycles becomes much less compared to a case in which all inputs are processed for each of the depth-cycles, which would significantly delay the output generation. As shown, weights are re-used for the different sets of activation input bits in the input batch. At the last cycle, the final outputs may be transferred to the memory (e.g., the output TCM), as described below.

Figure 5:
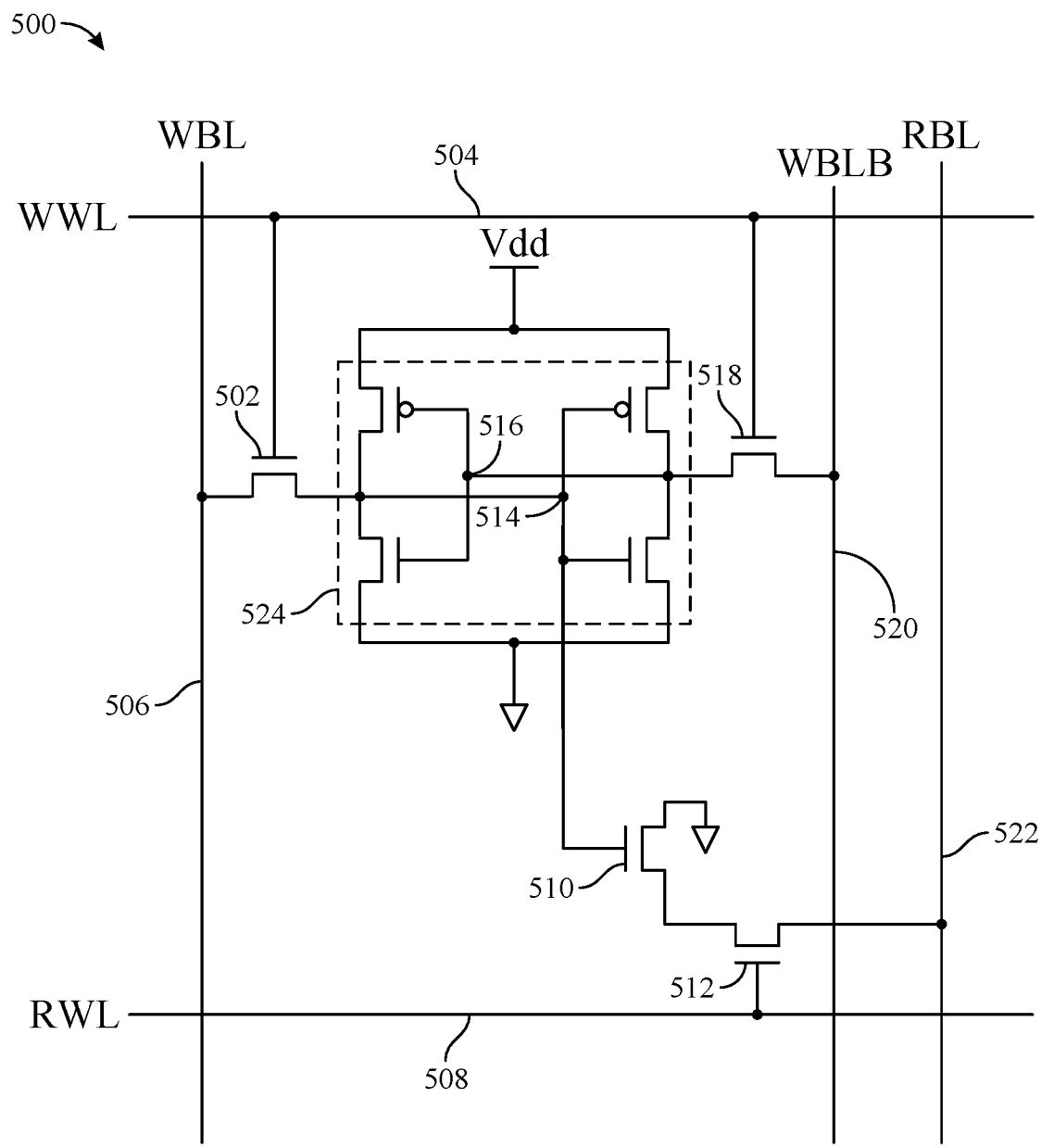
FIG. 5 illustrates an example compute-in-memory (CIM) cell for the DCIM architecture of FIG. 4, implemented as an eight-transistor (8T) static random-access memory (SRAM) cell.

FIG. 5 illustrates an example CIM cell 500 of a static random-access memory (SRAM), which may be implemented in a CIM array, such as the CIM array 401 in the DCIM circuit 400 of FIG. 4. The CIM cell 500 may be referred to as an eight-transistor (8T) SRAM cell because the CIM cell is implemented with eight transistors.

As shown, the CIM cell 500 may include a cross-coupled invertor pair 524 having an output 514 and an output 516. As shown, the cross-coupled invertor pair output 514 is selectively coupled to a write bit-line (WBL) 506 via a pass-gate transistor 502, and the cross-coupled invertor pair output 516 is selectively coupled to a complementary write bit-line (WBLB) 520 via a pass-gate transistor 518. The WBL 506 and WBLB 520 are configured to provide complementary digital signals to be written (e.g., stored) in the cross-coupled invertor pair 524. The WBL and WBLB may be used to store a bit for a neural network weight in the CIM cell 500. The gates of pass-gate transistors 502, 518 may be coupled to a write word-line (WWL) 504, as shown. For example, a digital signal to be written may be provided to the WBL (and a complement of the digital signal is provided to the WBLB). The pass-gate transistors 502, 518—which are implemented here as n-type field-effect transistors (NFETs)—are then turned on by providing a logic high signal to WWL 504, resulting in the digital signal being stored in the cross-coupled invertor pair 524.

As shown, the cross-coupled invertor pair output 514 may be coupled to a gate of a transistor 510. The source of the transistor 510 may be coupled to a reference potential node (Vss or electrical ground), and the drain of the transistor 510 may be coupled to a source of a transistor 512. The drain of the transistor 512 may be coupled to a read bit-line (RBL) 522, as shown. The gate of transistor 512 may be controlled via a read word-line (RWL) 508. The RWL 508 may be controlled via an activation input signal.

During a read cycle, the RBL 522 may be precharged to logic high. If both the activation input bit and the weight bit stored at the cross-coupled invertor pair output 514 are logic high, then transistors 510, 512 are both turned on, electrically coupling the RBL 522 to the reference potential node at the source of transistor 510 and discharging the RBL 522 to logic low. If either the activation input bit or the weight bit stored at the cross-coupled invertor pair output 514 is logic low, then at least one of the transistors 510, 512 will be turned off, such that the RBL 522 remains logic high. Thus, the output of the CIM cell 500 at the RBL 522 is logic low only when both the weight bit and the activation input bit are logic high, and is logic high otherwise, effectively implementing a NAND-gate operation.

Example Neural-Network-Processing Architectures and Dataflow

Figure 6:
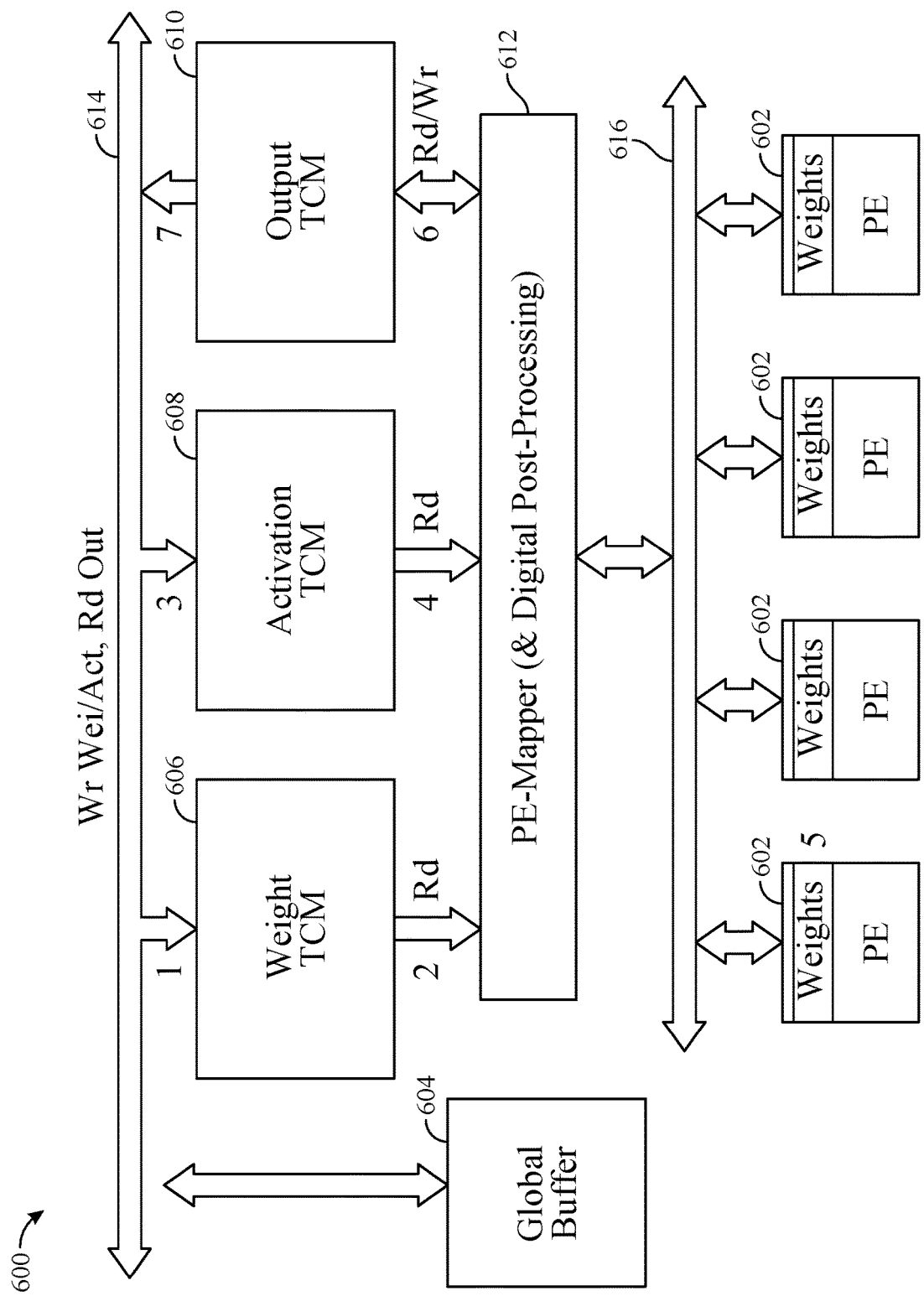
FIG. 6 is a block diagram of an example neural-network-processing architecture with tightly coupled memory (TCM) and processing elements (PEs), illustrating an example dataflow sequence, in which certain aspects of the present disclosure may be implemented.

FIG. 6 is a block diagram of an example neural-network-processing architecture 600, illustrating an example dataflow sequence, in which certain aspects of the present disclosure may be implemented. The neural-network-processing architecture 600 may include a plurality of processing elements (PEs) 602 for performing data computation (e.g., multiply-and-accumulate (MAC) operations) and other operations. The PEs 602 may be implemented with any of various suitable circuits, such as the DCIM circuit 400 of FIG. 4. The architecture 600 may also include a global memory 604 (labeled "Global Buffer"), a weight tightly coupled memory (TCM) 606, an activation TCM 608, an output TCM 610, PE-mapper logic 612 (which may also include bus arbitration logic (not shown) and/or digital post-processing logic (not shown)), a memory bus 614, and a PE bus 616. As used herein, a TCM generally refers to a memory accessed by a dedicated connection from the processor(s), such as the PEs 602. Although shown as separate TCMs, the weight TCM 606, the activation TCM 608, and/or the output TCM 610 may be combined. The memory bus 614 may couple the global memory 604 to the weight TCM 606, the activation TCM 608, and the output TCM 610. The PE bus 616 may couple the PEs 602 and the PE-mapper logic 612 together. In this manner, the PEs 602 may access the memory resources (e.g., the weight TCM, the activation TCM, and the output TCM).

In the dataflow sequence shown, weights may be loaded from the global memory to the weight TCM 606. Then, the weights may be loaded from the weight TCM 606 to the PE weight arrays (e.g., in the CIM cells of the PEs). Activation inputs may be loaded from the global memory 604 to the activation TCM 608. Then, the activation inputs may be loaded from the activation TCM 608 to the PE bus 616 (or at least a portion of the PE bus operating as an activation bus). After the weights have been loaded in the PEs 602 and the activations are ready on the activation bus, the PEs 602 may perform computations (e.g., MAC operations) over multiple computation cycles to generate final accumulation results. The final accumulation results may be processed (e.g., by the PE-mapper logic 612, or more specifically for certain cases, the digital post-processing logic), and the processed results may be written to the output TCM 610. From the output TCM 610, the processed accumulation results may be loaded in the global memory 604 via the memory bus 614.

Example Reconfigurable Systolic Flow Architecture and Partial Sum Management

As described above, compute-in-memory (CIM) technology is solving the energy and speed bottlenecks arising from moving data from memory and the processing system (e.g., the central processing unit (CPU)). CIM offers energy efficiency and significantly less memory accesses in weight-stationary use cases. As used herein, the term "weight-stationary" generally refers to a re-use architecture where the neural network weights remain stationary during operation (e.g., after being initially loaded) and the inputs are streamed in. Weight-stationary mapping may be used in CIM to reduce the overhead of the weight update time during operation.

Despite these benefits, CIM and other weight-stationary mapping schemes may have some challenges in certain applications. For example, the weight-stationary operation of some neural-network-processing circuits (e.g., DCIM PEs) may force these circuits to offload and reload (e.g., write and read) partial accumulation results to a memory (e.g., the output TCM) for the final accumulation. Also referred to as "partial sums," partial accumulation results are not final data, or in other words, are not yet ready to become (or to be transferred to digital post-processing logic before the results become) an activation input for the next layer nor data to be stored in the output TCM as the final result of a layer. Rather, partial sums may be temporarily stored in the output TCM and read back to the DCIM PEs for further processing in one or more cycles until the final accumulation output is ready. These partial sums may then be discarded when the final outputs are ready to be processed (e.g., by the digital post-processing logic).

In some cases, weight-stationary mapping may force the partial accumulation results to be written to a buffer memory and read back from the buffer memory for a subsequent input feature multiply-and-accumulate (MAC) operation, which may create overhead in terms of energy and a performance penalty (e.g., in terms of lower tera-operations per second (TOPS)) if this read/write cannot be handled in the same MAC cycle. In other words, having to store and reload these partial accumulation results leads to storage area, bandwidth, and throughput (e.g., TOPS) penalties in the neural-network-processing architecture. In some cases, the circuit overhead to handle the partial sums can reduce the area advantage of DCIM solutions compared to other neural-network-processing solutions (e.g., neural process units (NPUs)). This offloading and reloading can also introduce a significant latency penalty in some instances.

Certain aspects of the present disclosure provide a neural-network-processing architecture and circuits to handle the partial sums with no throughput penalty, thereby reducing the bottleneck writing and reading back and forth from the memory. The circuits may be referred to as concurrent multiply-and-accumulate (MAC) and partial sum store and reload circuits. The architecture may be referred to as a "reconfigurable systolic flow architecture." Both the architecture and the circuits are described below.

Figure 7:
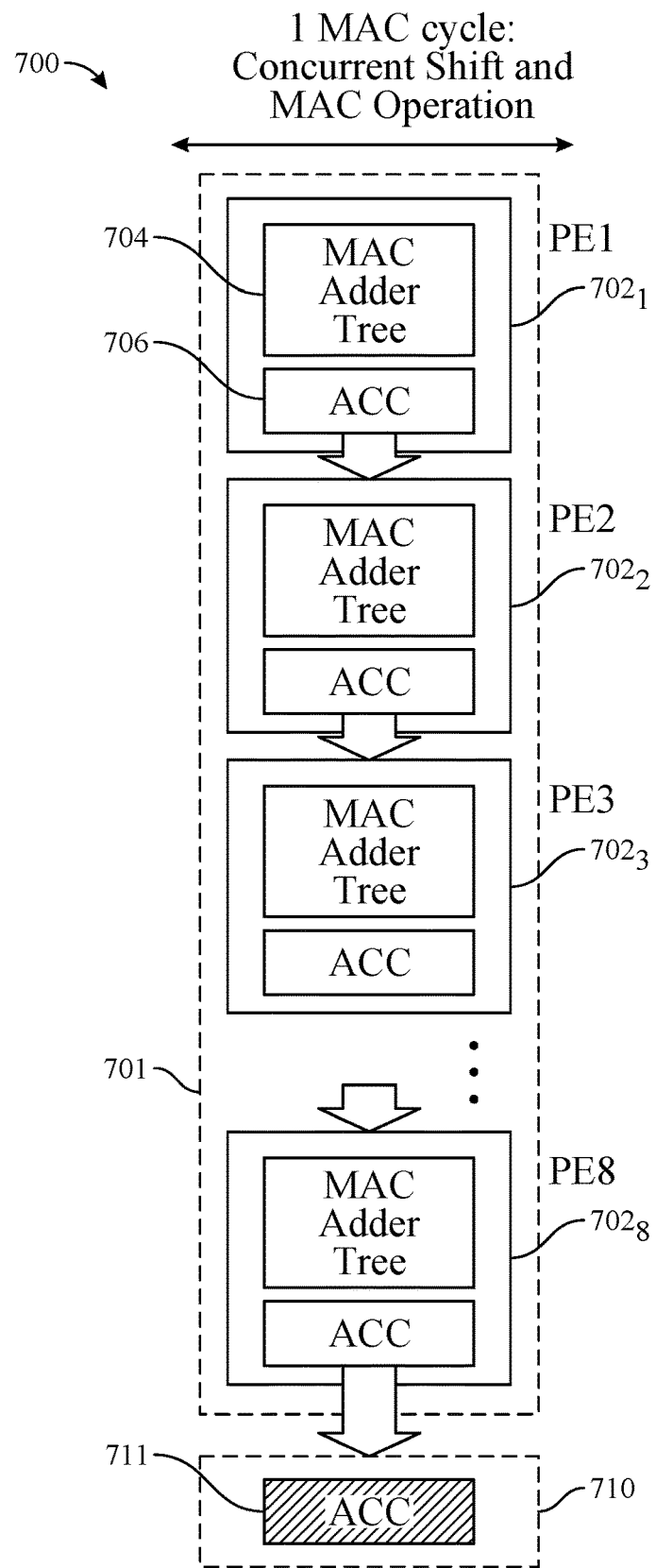
FIG. 7 is a block diagram of a systolic flow architecture for connecting different PEs for concurrent shift and multiply-and-accumulate (MAC) operations, in accordance with certain aspects of the present disclosure.

FIG. 7 is a block diagram of an example systolic flow architecture 700, in accordance with certain aspects of the present disclosure. The systolic flow architecture 700 may include a cascaded series 701 of PE circuits $702_1$ to $702_8$ (collectively referred to as "PE circuits 702") and a global accumulator circuit 710 (also referred to as a "fat accumulator circuit"). Although eight PE circuits 702 are represented in the example systolic flow architecture 700, the reader is to understand that the series 701 may include any number of cascaded PE circuits.

The PE circuits 702 may be implemented by any of various suitable PE circuits, such as the DCIM circuit 400 of FIG. 4 or other weight-stationary mapping PE circuits. The PE circuits 702 may replace at least some of the PE circuits in a neural network architecture, such as the PEs 602 in the architecture 600 of FIG. 6. As illustrated in FIG. 7, each of the PE circuits 702 includes a multiply-and-accumulate (MAC) adder tree 704 and a local accumulator 706 (also referred to as a "light accumulator"). The MAC adder tree 704 may represent or be implemented by any of various suitable circuits for performing MAC operations, such as the CIM array 401 (e.g., with thirty-two rows and eight columns), bit-column adder tree 409, and weight-shift adder tree circuit 412 of FIG. 4. The local accumulator 706 in each PE circuit 702 may represent or be implemented by the activation-shift accumulator circuit of 416 of FIG. 4. The global accumulator circuit 710 may include a large accumulator 711 (also referred to as the "fat accumulator"), which may have a higher number of bits (e.g., 32 bits) compared to the bit-size of the local accumulators 706 (e.g., 21 bits) and which is therefore represented in FIG. 7 with shading. By designing the PE circuits with smaller bit-size local accumulators 706, the cascaded series 701 may occupy a smaller area than if each of the PE circuits had a higher bit-size large accumulator 711.

The PE circuits 702 may be systolically connected such that the output of a local accumulator 706 from one PE circuit (e.g., PE circuit $702_1$) is input as a partial accumulation result to the MAC adder tree 704 of a subsequent PE circuit (e.g., PE circuit $702_2$). In this manner, the partial accumulation results from each PE circuit 702 need not be stored and then reloaded. Instead of the individual PE circuits, the global accumulator circuit 710 may write the accumulation results to an output TCM (e.g., the output TCM 610). Furthermore, each PE circuit 702 may perform concurrent shift and MAC operations during a MAC cycle. In other words, concurrently while the PE circuit 702 is shifting data out (e.g., to the next PE circuit or to the global accumulator circuit 710), the MAC adder tree 704 may be computing with input data, and the local accumulator 706 may be running. This concurrent shift and MAC operation is possible due to flip-flops (e.g., FF array 422) in the local accumulator 706 operating as a shift register.

The depth-wise spatial tiling of the systolic flow architecture 700 reduces the overall number of MAC cycles to achieve final results and decreases the number of partial sum writes and reads, in depth-heavy workloads. Moreover, this systolic implementation has less timing overhead compared to other solutions, such as a neural processing unit (NPU) solution. For example, it may take a single MAC cycle to generate the sum of the results of 8 PE circuits 702, where eight bit-serial clock cycles equals one MAC cycle. An equivalent NPU solution may take 8 MAC cycles for the same computation.

With an example scheme of eight 32-row PE circuits 702, the systolic flow architecture 700 is basically emulating a memory array with 256 rows (instead of 32 rows for a single PE circuit). However, a single, direct 256-row memory array may not be mapped efficiently to some workloads. Each PE circuit 702 can load weights in parallel, which decreases the weight-loading time compared to loading weights row-by-row, especially for a 256-row memory array. Each PE circuit 702 can also accumulate independently for workloads that are not depth-heavy. This enables flexibility and, thus, a better utilization efficiency for the PE assignment for computation.

Within a neural network circuit, the systolic flow architecture 700 may be reconfigurable such that aspects of the architecture may be changed, such as the number of PE circuits 702 cascaded in series. A compiler for the neural network may be used to select the initial components and make any reconfigurations.

Figure 8A:
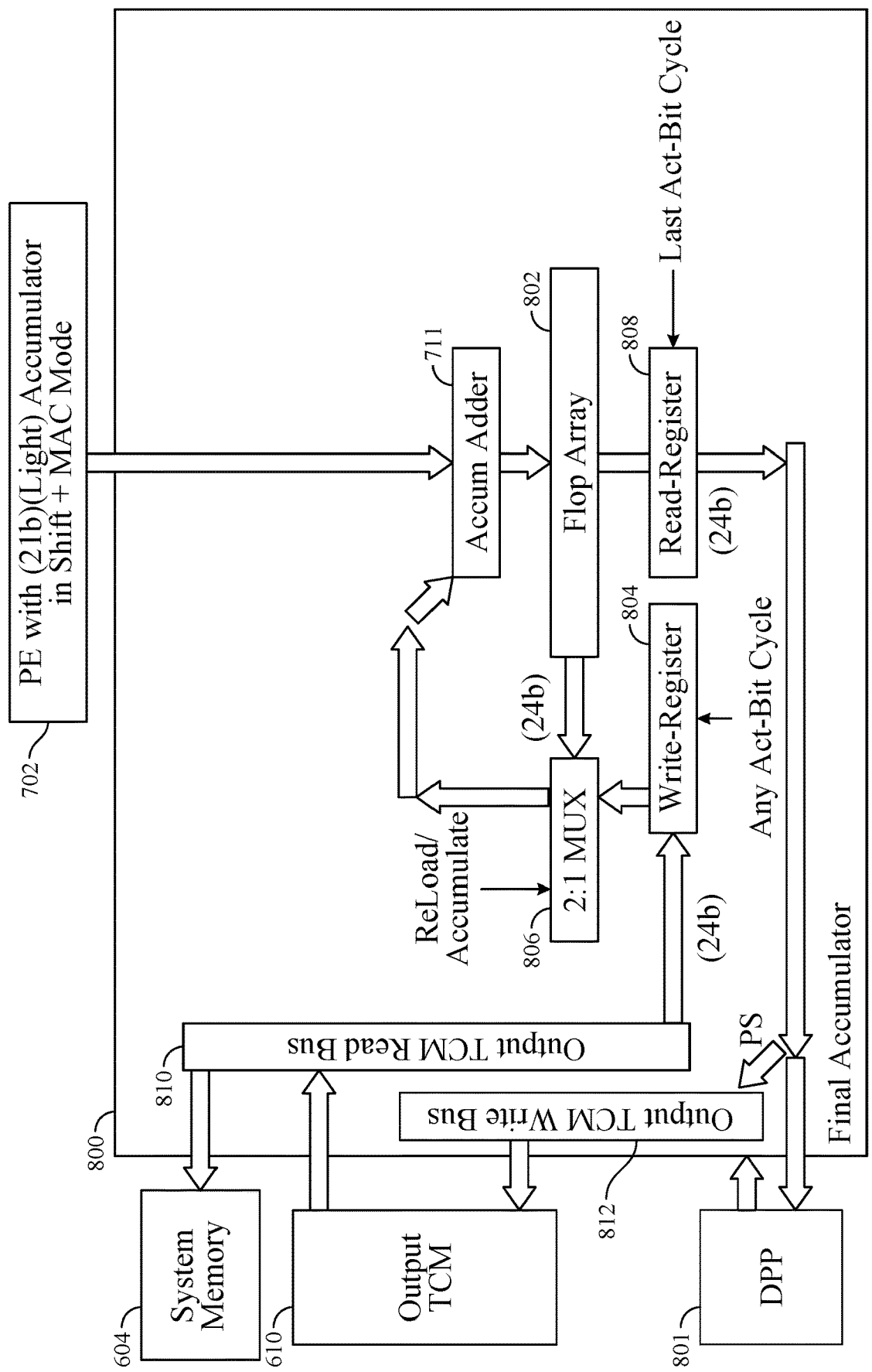
FIGS. 8A-8C are block diagrams of different example implementations of a global accumulator circuit and connections with a global memory, an output TCM, and a PE, in accordance with certain aspects of the present disclosure.
Figure 8B:
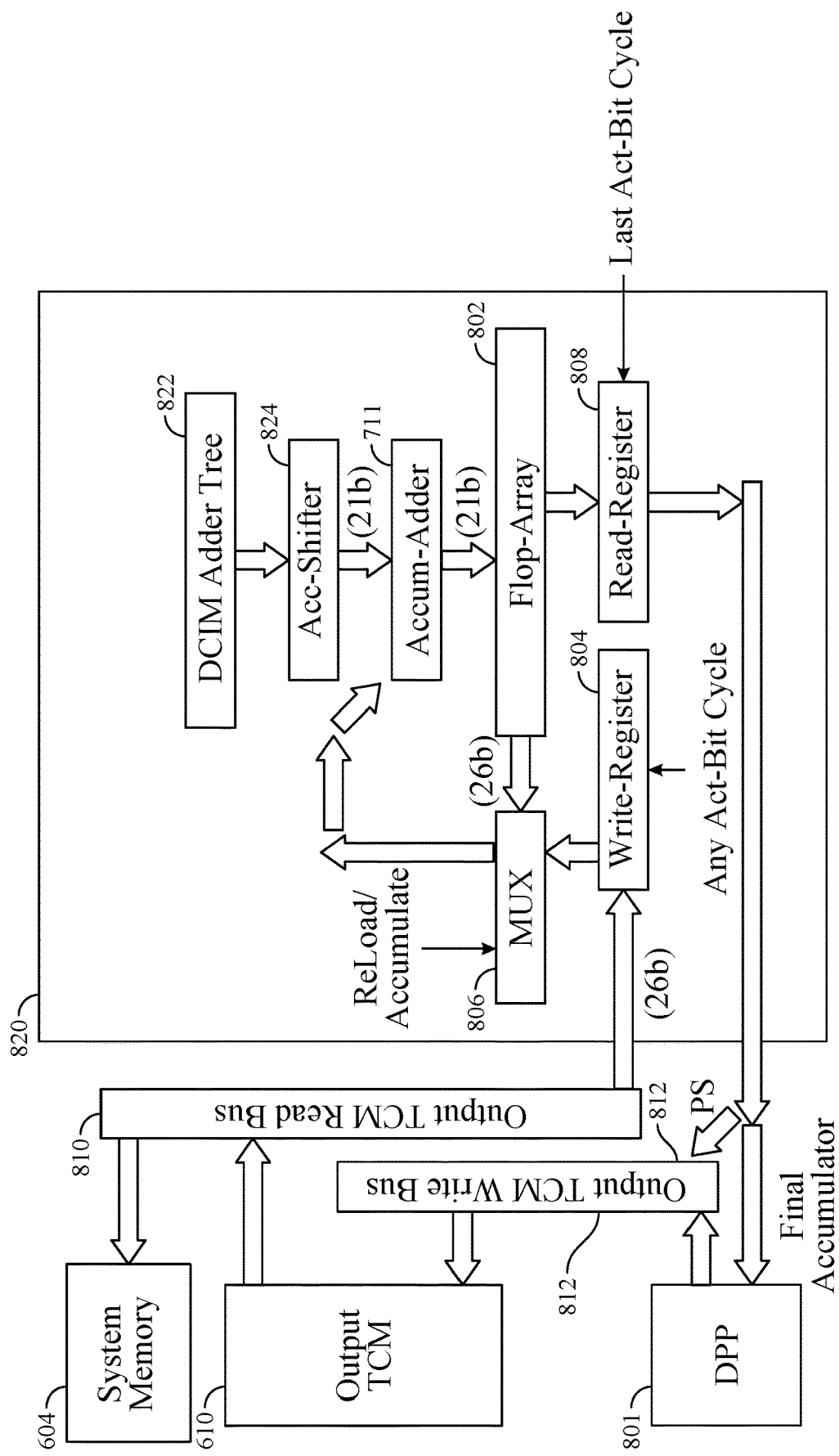
Figure 8C:
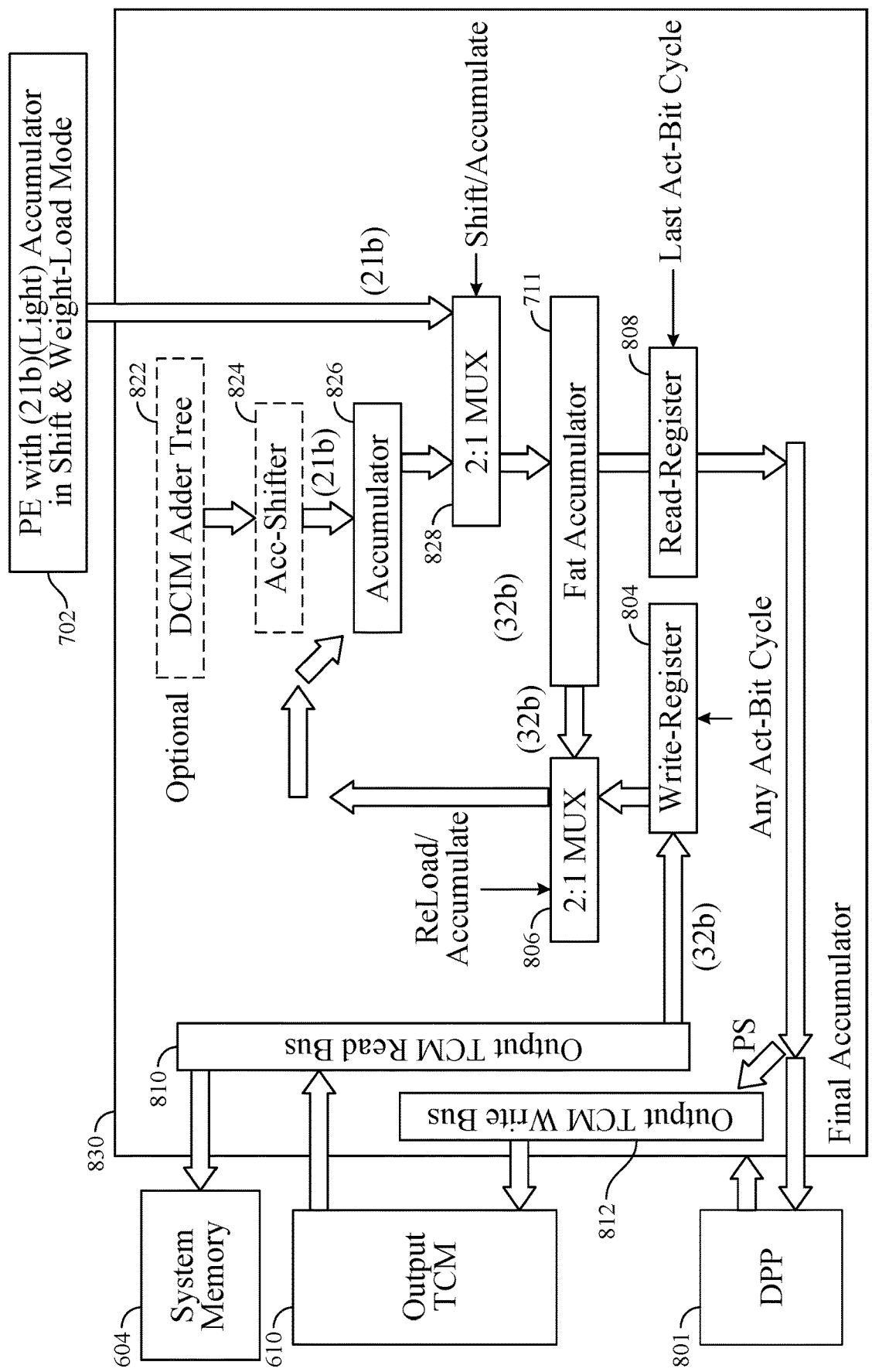

FIGS. 8A-8C are block diagrams of different example implementations of the global accumulator circuit 710, showing other components for context, in accordance with certain aspects of the present disclosure. These other components may include, for example, a global memory, an output TCM, and/or a PE circuit.

FIG. 8A includes a block diagram of an example global accumulator circuit 800 (also referred to as a "fat accumulator module") and illustrates connections with a global memory 604 (labeled "system memory") of FIG. 6, an output TCM 610 of FIG. 6, digital post-processing logic 801, and a PE circuit 702 of FIG. 7. The global accumulator circuit 800 includes the large accumulator 711, a flip-flop array 802 (labeled "flop array"), a write register 804, and a multiplexer 806. The write register 804 may be sized for 24 bits, for example. The global accumulator circuit 710 may also include a read register 808, an output TCM write bus 812, and an output TCM read bus 810. The read register 808 may be sized similar to the write register 804 (e.g., 24 bits).

The output TCM read bus 810 may be coupled between the write register 804 and the output TCM 610, for example, for reading stored data (e.g., partial sums) from the output TCM and loading this read data into the write register. The output TCM read bus 810 may also be coupled between the output TCM 610 and the global memory 604, for example, for reading stored data (e.g., final results) from the output TCM and writing this read data into the global memory 604. The output TCM write bus 812 may be coupled between the read register 808 and the output TCM 610, for example, for loading data (e.g., partial sums) from the read register into the output TCM. The digital post-processing logic 801 (labeled "DPP") may be coupled between the read register 808 and the output TCM write bus 812, for example, for processing data (e.g., a final accumulation result) from the read register 808 before this data is written to the output TCM 610 via the output TCM write bus 812.

The multiplexer 806 has a first data input coupled to an output of the write register 804 and a second data input coupled to an output of the flip-flop array 802. The output of the multiplexer 806 is coupled to a first input of the large accumulator 711. A control input of the multiplexer 806 may receive a control signal (labeled "Reload/Accumulate") configured to select whether the multiplexer selects to output the reloaded data from the write register 804 or the previous value of the large accumulator 711 from the flip-flop array 802. An output of the PE circuit 702 is coupled to a second input of the large accumulator 711, and an output of the large accumulator is coupled to an input of the flip-flop array 802, which may have a bit-size similar to the write register 804 (and the read register 808). The output of the flip-flop array may be coupled to an input of the read register 808.

Operating as the partial sum reload circuitry for the systolic flow architecture 700, the write register 804 may be loaded during any activation-input-bit (Act-Bit) cycle. The read register 808 operates as the partial sum store circuitry and may write its value to the output TCM 610 via the output TCM write bus 812 at the end of the current MAC cycle (e.g., after the first cycle following the last Act-Bit cycle). The write register 804 and the read register 808 may be used to maximize (or at least increase) the utilization of the output TCM write and read busses without having to wait for Act-Bit cycles.

During operation, a previously stored partial sum value may be read from the output TCM 610 and loaded into the write register 804. The multiplexer 806 may select either (A1) the reloaded data from the write register 804 or (A2) the previous value of the large accumulator 711 from the flip-flop array 802, according to the selection control signal. The large accumulator 711 may accumulate the selection (A1 or A2) with (B) the accumulation result from the previous PE circuit 702 (e.g., the contents of the shift register in the local accumulator 706). The accumulation result from the last Act-Bit cycle may be loaded into the read register 808. The value in the read register 808 may be transferred to the output TCM 610 in any one of the Act-Bit cycles within a MAC cycle (e.g., the first one of the next 8 Act-Bit cycles), whenever the output TCM write bus 812 is available.

Since the delay addition of the 2:1 multiplexer 806 is quite small (e.g., one logic gate delay) and not in a speed-critical path for the systolic flow architecture 700, there should be no penalty on the operating frequency of the architecture. Furthermore, this solution has a limited energy penalty of one flop cycle out of the Act-Bit cycles within a MAC cycle (e.g., out of 8 Act-Bit cycles).

When the global accumulator circuit 800 with the partial sum store and reload circuitry (the write register 804, the read register 808, and the multiplexer 806) is coupled to an output of the cascaded series 701 of PE circuits 702, the PE circuits may not include partial sum store and reload circuitry and may not have connections to the output TCM read bus 810 or the output TCM write bus 812. For example, the PE circuits 702 may not include a write register, a read register, or a multiplexer, or at least these circuits need not be coupled to the output TCM write and read busses. This configuration limits the area overhead of partial sum store and reload circuitry to the overall area of a PE array (e.g., an array of the PEs 602 in FIG. 6 or the cascaded series 701 of PE circuits 702 in FIG. 7).

FIG. 8B includes a block diagram of an example PE circuit 820 with partial accumulation store and reload circuitry, in accordance with certain aspects of the present disclosure. The PE circuit 820 may be used to implement the PE circuits 702 in the cascaded series 701 and/or the global accumulator circuit 710. In this manner, a single PE circuit 820 could be replicated and used to implement all the blocks in the systolic flow architecture 700, if desired. In such a case, the partial sum store and reload circuitry may be disabled for PE circuits 820 that are implementing the cascaded series 701 of PE circuits 702, but may be enabled for the PE circuit 820 implementing the global accumulator circuit 710. Unlike the global accumulator circuit 800 in FIG. 8A, the output TCM write bus 812 and the output TCM read bus 810 are external to the PE circuit 820 in FIG. 8B. The PE circuit 820 adds a CIM circuit (e.g., the DCIM circuit 400) to the other components (e.g., the non-bus components) of the global accumulator circuit 800 in FIG. 8A. For example, the PE circuit 820 adds a MAC adder tree 822 (e.g., a DCIM adder tree or other adder circuit) and an accumulator-and-shifter circuit 824 (e.g., the activation-shift accumulator circuit 416). The MAC adder tree 822 may be implemented by the MAC adder tree 704, and the accumulator-and-shifter circuit 824 may be implemented by the local accumulator 706 of FIG. 7.

FIG. 8C includes a block diagram of an example global accumulator circuit 830 with partial accumulation store and reload circuitry and an additional multiplexer 828, in accordance with certain aspects of the present disclosure. Furthermore, the global accumulator circuit 830 may include an accumulator 826 having a first input coupled to an output of the multiplexer 806 and having an output coupled to a first input of the additional multiplexer 828. The output of a PE circuit 702 may be coupled to a second input of the additional multiplexer 828. For certain aspects, the global accumulator circuit 830 includes an optional MAC adder tree 822 and an optional accumulator-and-shifter circuit 824, as described above with respect to FIG. 8B. In this case, the global accumulator circuit 830 may function as both a PE circuit and a global accumulator circuit and, thus, may replace both the last PE circuit (e.g., PE circuit $702_8$) in the cascaded series 701 and the global accumulator circuit 710 in a systolic flow architecture. The additional multiplexer 828 has a control input receiving a selection signal (labeled "Shift/Accumulate") configured to select between the accumulated data from the accumulator 826 or the output from the previous PE circuit (e.g., PE circuit 7027) in the cascaded series.

Figure 9A:
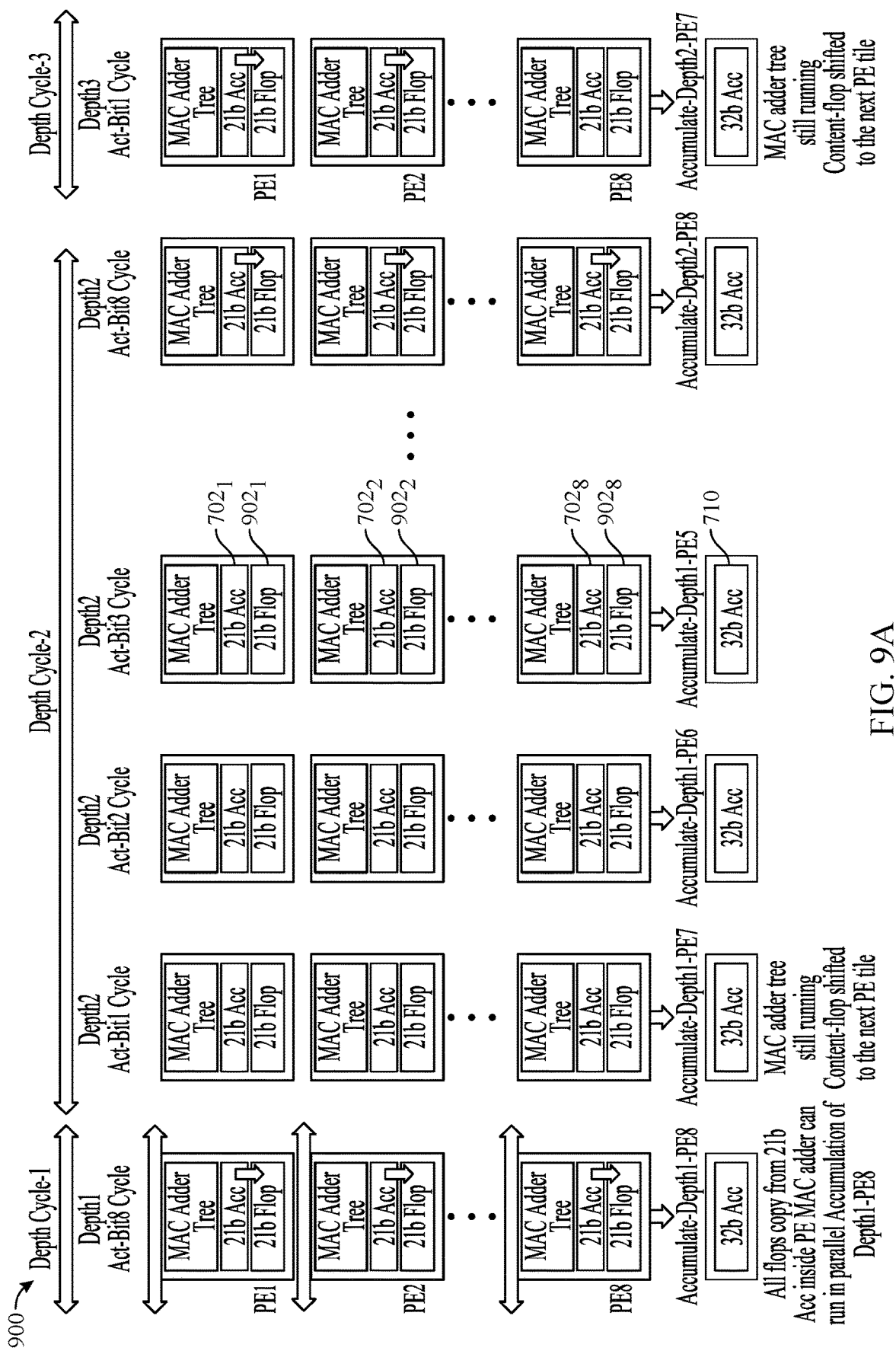
FIG. 9A illustrates cycle-by-cycle systolic operation for the example systolic flow architecture of FIG. 7, in accordance with certain aspects of the present disclosure.

FIG. 9A is a timing diagram 900 illustrating an example cycle-by-cycle systolic operation for the systolic flow architecture 700 of FIG. 7, in accordance with certain aspects of the present disclosure. In this example, the cascaded series 701 has eight PE circuits 702 (labeled "PE1" to "PE8"), and each depth cycle (e.g., each MAC cycle) includes eight Act-Bit cycles to complete the final accumulation. Each PE circuit $702_1$ to $702_8$ includes a flop array 9021 to 9028 (collectively referred to as "flop arrays 902"), respectively, which may represent a plurality of flip-flops implementing a shift register (e.g., similar to the FF array 422 in FIG. 4). As described above, the flop arrays 902 in each PE circuit 702 copy the bits (representing the partial accumulation results) from the local accumulator 706 and transfer the copied bits to the next PE circuit 702 in the series (and more specifically to the flop in the next PE circuit), instead of to the output TCM (as done in other DCIM solutions where the partial sums were transferred in parallel from the DCIM PEs). Thus, the flop arrays 902 may be referred to as "copy registers." The flop arrays 902 may run independently from the local accumulators 706 and may transfer their contents at each Act-Bit cycle. Also as described above, the MAC adder tree 704 and the local accumulator 706 may run in parallel with the shifting operation of the flop arrays 902.

Starting from the left at the end of the last bit-serial cycle of the first depth cycle (labeled "Depth Cycle-1" and "Act-Bit8 Cycle"), the final accumulation result may be generated by the global accumulator circuit 710 and, for certain aspects, stored in the read register 808 as described above. At some time during the next depth cycle (labeled "Depth Cycle-2"), the global accumulator circuit 710 may write the final accumulation result to the output TCM 610 (e.g., via the output TCM write bus 812). At the first bit-serial cycle of the next depth cycle (labeled "Depth2, Act-Bit1 Cycle"), the MAC operations may be performed in the MAC adder tree 704 of each PE circuit, and concurrently with the MAC operations, the contents of flop array 9021 may be shifted to PE circuit $702_2$, the contents of flop array 9022 may be shifted to PE circuit 7023, and so on where the contents of flop array 9028 are shifted to the global accumulator circuit 710. Similar operations are performed at each bit-serial cycle in Depth Cycle-2, until the final accumulation result for Depth Cycle-2 is generated by the global accumulator circuit 710 at the last bit-serial cycle (labeled "Depth 2, Act-Bit8 Cycle"). The systolic operation repeats starting with the first bit-serial cycle of Depth Cycle-3, and so on, until all depth cycles have been completed.

In the example of FIG. 9A, the number of PE circuits 702 matched the number of activation-input-bit cycles (e.g., eight PE circuits). In some cases, it may be possible to use a cascaded series with a greater number of PE circuits than the number of activation-input-bit cycles. This may occur, for example, when a neural network workload calls for a number of PE circuits, but this number does not fit a standard systolic flow configuration, or when the compiler fits the neural network design to a systolic flow configuration that comprises a greater number of cascaded PE circuits than needed. For example, if a workload called for ten PE circuits, but the systolic mapping was for eight PE circuits, then one solution would be to use one set of PE circuits (e.g., five PE circuits) in a first MAC cycle and another set of PE circuits (e.g., five PE circuits, which may be the same five PE circuits) in a second MAC cycle. However, this solution takes two MAC cycles, thereby negatively impacting the throughput (e.g., half of the TOPS for a single MAC cycle). Instead, the MAC cycle length could be increased by using a dummy cycle for each extra PE circuit. In dummy cycles, all activation inputs are 0, but the contents of the flop arrays 902 may still be transferred to the global accumulator circuit and to the next PE circuits in the series during each dummy cycle. With all activation inputs equal to 0, no new MAC computations are performed, and no energy is consumed by at least the MAC circuits in the systolic flow architecture. Continuing the example above, two dummy cycles may be used for the extra two PE circuits, such that a single MAC cycle comprising eight activation-input-bit cycles and two dummy cycles could be used. Therefore, the impact to the throughput is only a 20% penalty (e.g., TOPS for a single MAC cycle*8/10), rather than the 50% penalty in the two-MAC-cycle solution.

Figure 9B:
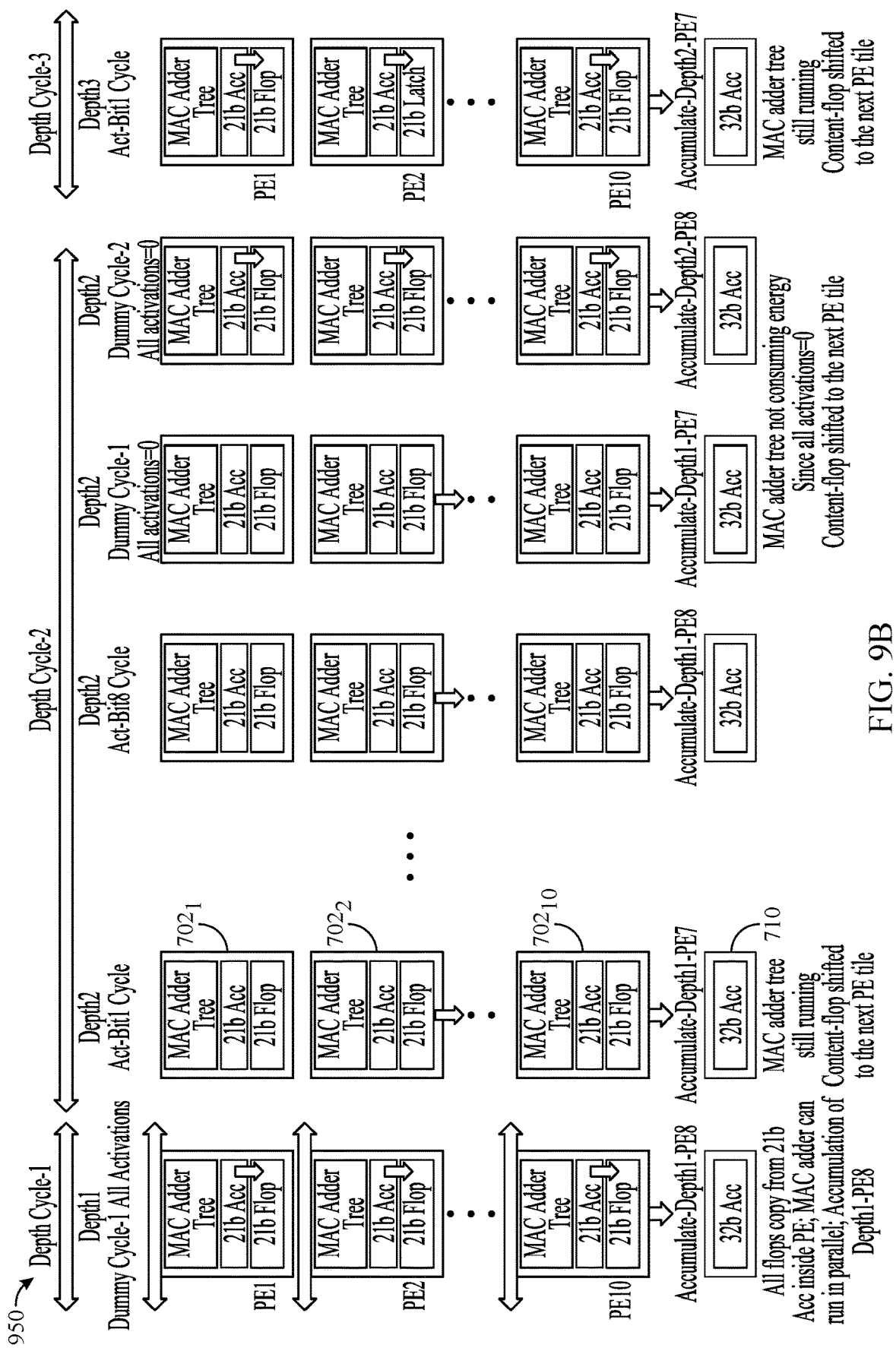
FIG. 9B illustrates cycle-by-cycle systolic operation with dummy cycles for an example systolic flow architecture having more PEs than activation-input-bit cycles, in accordance with certain aspects of the present disclosure.

For example, FIG. 9B is a timing diagram 950 illustrating cycle-by-cycle systolic operation with dummy cycles for an example systolic flow architecture having ten PE circuits 702 and eight activation-input-bit cycles, in accordance with certain aspects of the present disclosure. Thus, the systolic operation includes two dummy cycles (labeled "Dummy Cycle-1" and "Dummy Cycle-2") after Act-Bit1 through Act-Bit8 Cycles in each depth cycle. In Dummy Cycle-1 and Dummy Cycle-2, all activation inputs are 0, but the contents of the flop arrays 902 may still be transferred to the global accumulator circuit 710 and to the next PE circuits in the series during each dummy cycle.

Although shown at the end as consecutive cycles in the timing diagram 950 of FIG. 9B, the dummy cycles may occur at the beginning, the middle, and/or at the end of a depth cycle. Furthermore, in the case of multiple dummy cycles, at least some of the dummy cycles may be consecutive activation-input-bit cycles or may be separated in time (e.g., non-consecutive activation input-bit cycles).

Figure 10:
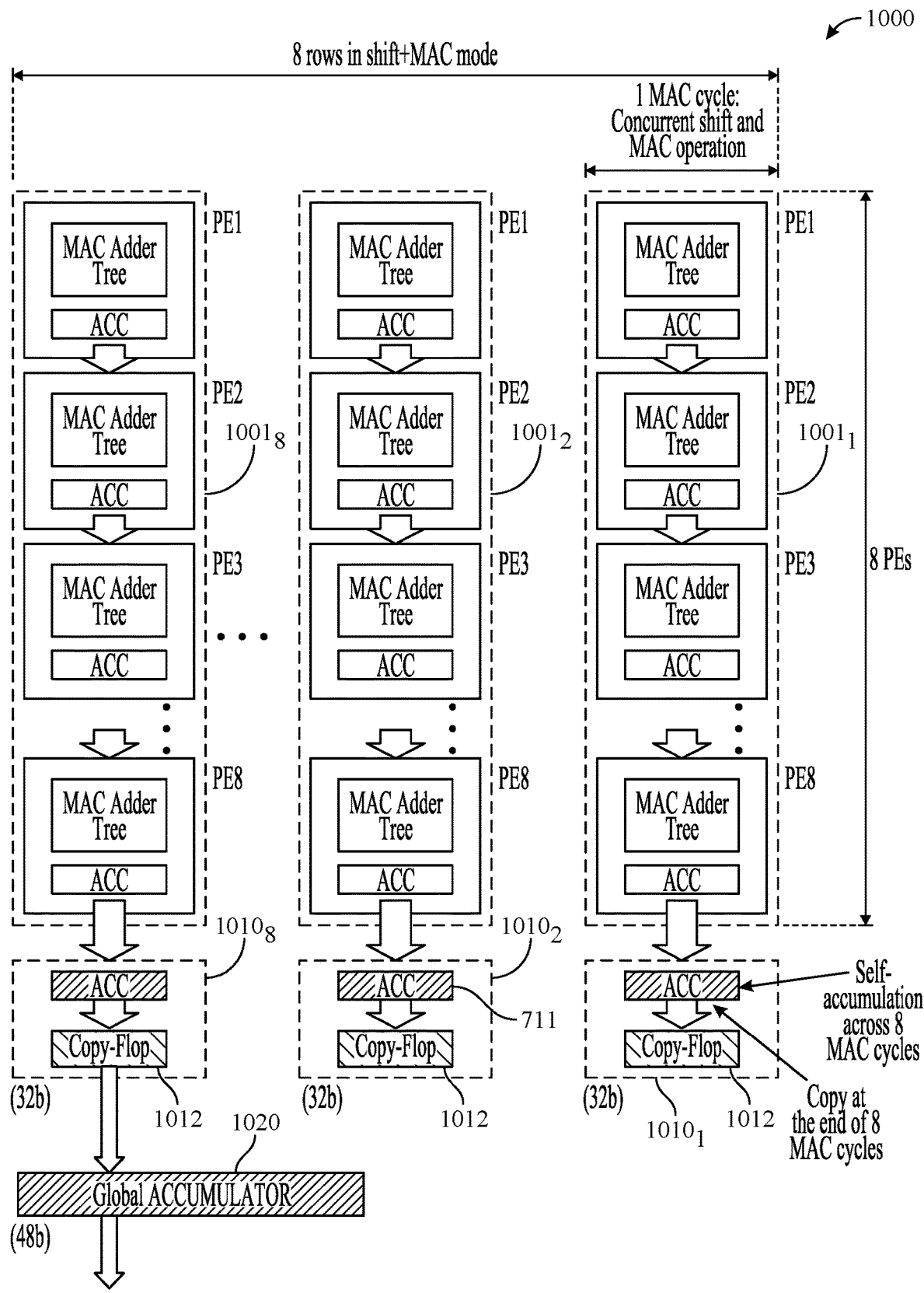
FIG. 10 is a block diagram of an example systolic architecture with more than one row, in accordance with certain aspects of the present disclosure.

FIG. 10 is a block diagram of an example extended systolic flow architecture 1000 with more than one row (e.g., more than one cascaded series of PE circuits and a global accumulator circuit), in accordance with certain aspects of the present disclosure. In this manner, the systolic flow architecture may be extended to any number of rows (also referred to as "channels"), allowing for any number of cascaded series per accumulation (in addition to the flexibility in the number of PE circuits in each cascaded series).

For example, the extended systolic flow architecture 1000 may include eight rows with a cascaded series $1001_1$ to $1001_8$ (collectively referred to as "cascaded series 1001") of eight PE circuits $702_1$ to $702_8$ (labeled "PE1" to "PE8" and as described with respect to FIG. 7) in each row. To extend this example, if each PE circuit 702 includes 32 inputs, then the extended systolic flow architecture 1000 effectively operates as a CIM circuit with 2048 inputs (=32 inputs×8 PE circuits×8 rows) per accumulation. It is to be understood that the extended systolic flow architecture 1000 may include more or less than eight rows and that each cascaded series 1001 may include more or less than eight PE circuits 702. Each row may also include a global accumulator circuit $1010_1$ to $1010_8$ (collectively referred to as "global accumulator circuits 1010") coupled to a last PE circuit in a respective cascaded series $1001_1$ to $1001_8$. The global accumulator circuits 1010 may each include a large accumulator 711 and a copy-flop 1012 coupled to an output of the large accumulator. The copy-flop 1012 may represent or be implemented as a shift register and may be used to transfer the accumulated data from one row to the next subsequent row (and more specifically, to the global accumulator circuit 1010 in the next subsequent row).

The extended systolic flow architecture 1000 may also have a super global accumulator circuit 1020. The super global accumulator circuit 1020 may have an input coupled to the global accumulator circuit $1010_8$ in the last row and an output coupled to the output TCM 610 of FIG. 6 (e.g., via an output TCM write bus that may be internal to the super global accumulator circuit). The super global accumulator circuit 1020 may have any suitable bit-size (e.g., 48 bits when there are eight rows, each with a large accumulator 711 having a bit-size of 32 bits) to generate and handle a final global accumulation result for the extended systolic flow architecture 1000.

The extended systolic flow architecture 1000 may operate as two nested accumulations, where the inner loop generates a final accumulation result at the output of each global accumulator circuit 1010 (similar to the systolic flow architecture 700) and where the outer loop generates the final global accumulation result at the output of the super global accumulator circuit 1020. As with the example of FIG. 9A, the final accumulation result in each row may be ready after eight activation-input-bit cycles (with the eight PE circuits 702 in each cascaded series 1001). However, rather than transferring the final accumulation result—which is still a partial sum for the workload—from each row to the output TCM in the next MAC cycle, the copy-flop 1012 in each row may transfer the final accumulation result to the global accumulator circuit 101 in the next subsequent row at any time during the next MAC cycle. In fact, with the extended systolic flow architecture 1000, there may be no need for partial sum reads and writes when the number of rows is sufficiently increased for a given workload. At the end of N MAC cycles, where N is the number of rows (here, N=8), the final global accumulation result may be generated in the super global accumulator circuit 1020 and may be transferred to the output TCM (e.g., via the digital post-processing logic) at any time during the next N MAC cycles.

Example Operations

Figure 11:
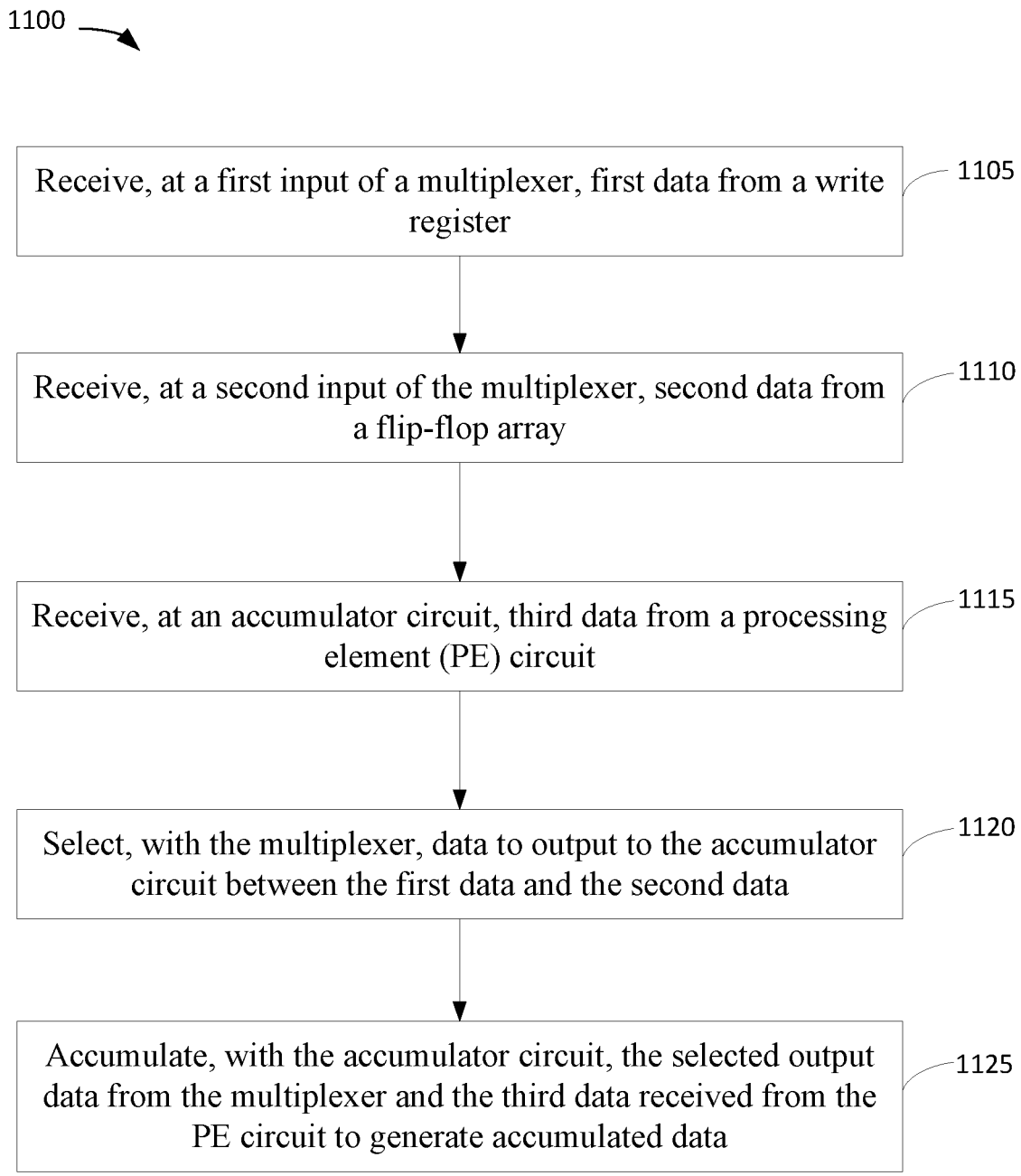
FIG. 11 is a flow diagram illustrating example operations for neural network processing, in accordance with certain aspects of the present disclosure.

FIG. 11 is a flow diagram illustrating example operations 1100 for neural network processing, in accordance with certain aspects of the present disclosure. The operations 1100 may be performed, for example, by a processing element (PE) circuit, such as the global accumulator circuit 800 or 830 of FIGS. 8A and 8C or the PE circuit 820 of FIG. 8B.

The operations 1100 may begin at block 1105 with a first input of a multiplexer (e.g., the multiplexer 806) receiving first data from a write register (e.g., the write register 804). At block 1110, a second input of the multiplexer receives second data from a flip-flop array (e.g., the flip-flop array 802). At block 1115, an accumulator circuit (e.g., the large accumulator 711) receives third data from a processing element (PE) circuit (e.g., a PE circuit 702, and more particularly in some cases, a last PE circuit in a cascaded series, such as the PE circuit $702_8$). The multiplexer selects data, between the first data and the second data, to output to the accumulator circuit at block 1120. At block 1125, the accumulator circuit accumulates the selected output data from the multiplexer and the third data received from the PE circuit to generate accumulated data (e.g., a partial sum or a final accumulation result).

According to certain aspects, the operations 1100 further include outputting the accumulated data to the flip-flop array; shifting, with the flip-flop array, the accumulated data to a read register (e.g., the read register 808); and writing the accumulated data from the read register to a tightly coupled memory (TCM) (e.g., the output TCM 610) via a write bus (e.g., the output TCM write bus 812). In this case, for example, the accumulated data may be a partial accumulation result.

According to certain aspects, the operations 1100 further involve outputting the accumulated data to the flip-flop array; shifting, with the flip-flop array, the accumulated data to a read register; processing the accumulated data from the read register with digital post-processing logic (e.g., the digital post-processing logic 801); and writing the processed, accumulated data to a TCM via a write bus coupled between the digital post-processing logic and the TCM. In this case, for example, the accumulated data may be a final accumulation result.

FIG. 12 is a flow diagram illustrating example operations 1200 for neural network processing, in accordance with certain aspects of the present disclosure. The operations 1200 may be performed by a neural network circuit with a (reconfigurable) systolic flow architecture (e.g., the systolic flow architecture 700 of FIG. 7 or the extended systolic flow architecture 1000 of FIG. 10).

The operations 1200 may begin at block 1205 with each processing element (PE) circuit (e.g., each PE circuit 702) in a set of cascaded PE circuits (e.g., the cascaded series 701 or 1001) performing a multiply-and-accumulate (MAC) operation. An output of a first PE circuit (e.g., the PE circuit $702_1$) in the set of cascaded PE circuits is coupled to an input of a second PE circuit (e.g., the PE circuit $702_2$) in the set of cascaded PE circuits. Each PE circuit in the set of cascaded PE circuits may include a MAC circuit (e.g., the MAC adder tree 704), a local accumulator circuit (e.g., the local accumulator 706 or the serial accumulator 420) having an input coupled to an output of the MAC circuit, and a set of flip-flops (e.g., the flop array 902 or the FF array 422) having an input coupled to an output of the local accumulator circuit.

At block 1210, the set of flip-flops in each PE circuit may perform a shifting operation to shift a value (e.g., a partial sum) from the PE circuit to a next PE circuit in the set of cascaded PE circuits or to a global accumulator circuit (e.g., the global accumulator circuit 710). In each PE circuit, the shifting operation may be performed concurrently with the performance of the MAC operation in block 1205.

At block 1215, the global accumulator circuit may accumulate the shifted values from a last PE circuit (e.g., the PE circuit $702_8$) in the set of cascaded PE circuits to generate accumulated data (e.g., the final accumulation result or a partial accumulation result).

According to certain aspects, the operations 1200 further involve loading weights in parallel into the set of cascaded PE circuits before performing the MAC operation in each PE circuit with the weights.

According to certain aspects, the accumulating at block 1215 includes writing, with the global accumulator circuit, partial sums to a memory (e.g., the output TCM 610). For certain aspects, the accumulating at block 1215 also includes reading, with the global accumulator circuit, the partial sums from the memory. The set of cascaded PE circuits may not write the partial sums to, or read the partial sums from, the memory According to certain aspects, the accumulating involves receiving, at a first input of a multiplexer (e.g., the multiplexer 806) in the global accumulator circuit, first data from a write register (e.g., the write register 804) in the global accumulator circuit; receiving, at a second input of the multiplexer, second data from a flip-flop array (e.g., the flip-flop array 802) in the global accumulator circuit; receiving, at another accumulator circuit (e.g., the large accumulator 711) in the global accumulator circuit, third data from a last PE circuit (e.g., the PE circuit 702$_8$) in the set of cascaded PE circuits; selecting, with the multiplexer, data to output to the other accumulator circuit between the first data and the second data; and accumulating, with the other accumulator circuit, the selected output data from the multiplexer and the third data to generate the accumulated data.

Example Device with Systolic Flow Architecture and/or Partial Sum Management

Figure 13:
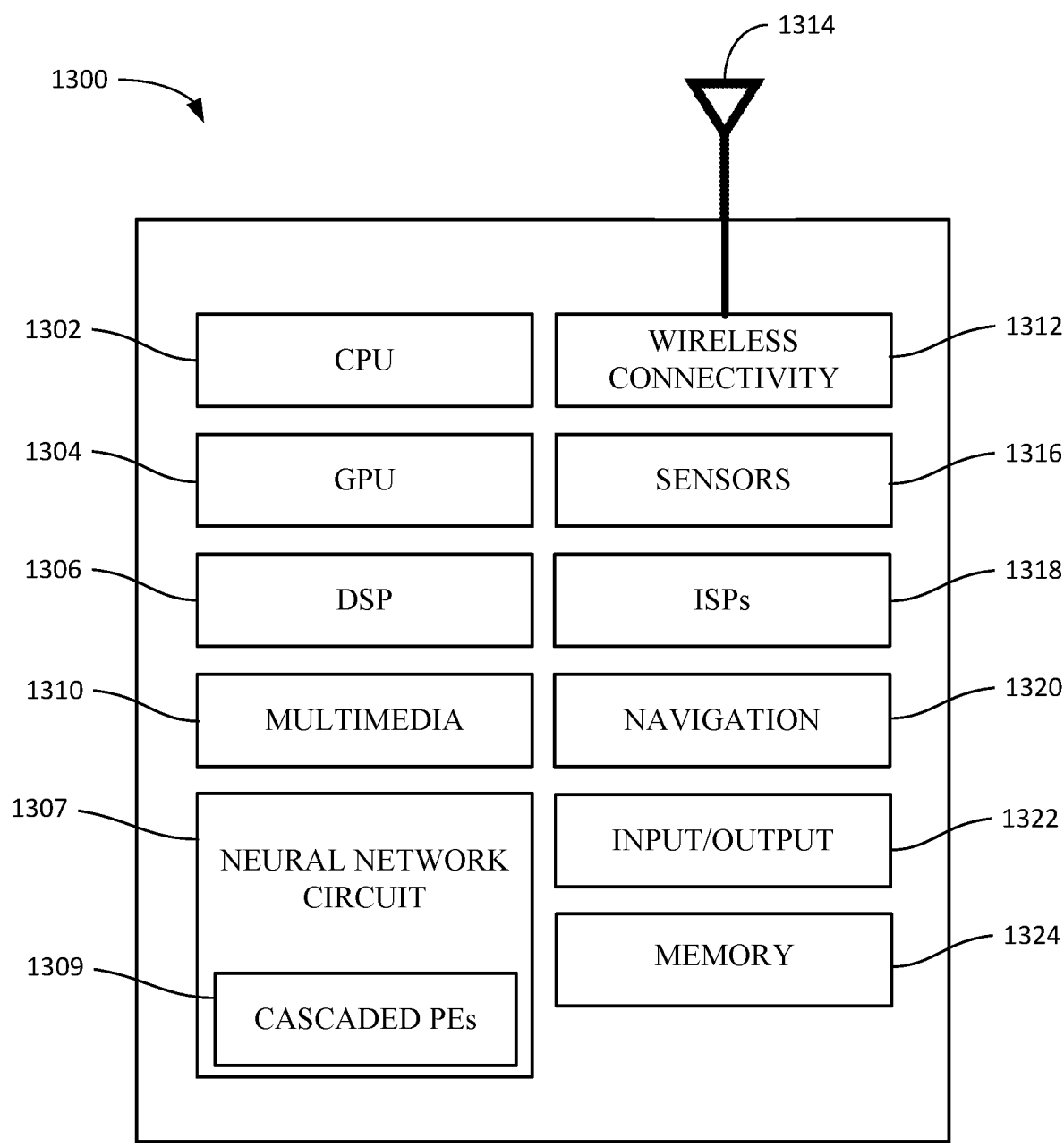
FIG. 13 is a block diagram illustrating an example electronic device having a neural-network-processing circuit implementing a systolic flow architecture and configured to perform machine learning tasks, in accordance with certain aspects of the present disclosure.

FIG. 13 illustrates an example electronic device 1300. The electronic device 1300 may be configured to perform the methods described herein, including the operations 1100 and/or 1200 described with respect to FIGS. 11 and 12.

The electronic device 1300 includes a central processing unit (CPU) 1302, which in some aspects may be a multi-core CPU. Instructions executed at the CPU 1302 may be loaded, for example, from a program memory associated with the CPU 1302 or may be loaded from a memory 1324.

The electronic device 1300 also includes additional processing blocks tailored to specific functions, such as a graphics processing unit (GPU) 1304, a digital signal processor (DSP) 1306, a neural network circuit 1307 with a set of cascaded PEs 1309 to implement a (reconfigurable) systolic flow architecture, a multimedia processing block 1310, and a wireless connectivity processing block 1312. In one implementation, the neural network circuit 1307 is implemented in one or more of the CPU 1302, GPU 1304, and/or DSP 1306.

In some aspects, the wireless connectivity processing block 1312 may include components, for example, for Third-Generation (3G) connectivity, Fourth-Generation (4G) connectivity (e.g., 4G LTE), Fifth-Generation connectivity (e.g., 5G or NR), Wi-Fi connectivity, Bluetooth connectivity, and/or wireless data transmission standards. The wireless connectivity processing block 1312 is further connected to one or more antennas 1314 to facilitate wireless communication.

The electronic device 1300 may also include one or more sensor processors 1316 associated with any manner of sensor, one or more image signal processors (ISPs) 1318 associated with any manner of image sensor, and/or a navigation processor 1320, which may include satellite-based positioning system components (e.g., Global Positioning System (GPS) or Global Navigation Satellite System (GLONASS)), as well as inertial positioning system components.

The electronic device 1300 may also include one or more input and/or output devices 1322, such as screens, touch-sensitive surfaces (including touch-sensitive displays), physical buttons, speakers, microphones, and the like. In some aspects, one or more of the processors of the electronic device 1300 may be based on an Advanced RISC Machines (ARM) instruction set, where RISC stands for "reduced instruction set computing."

The electronic device 1300 also includes memory 1324, which is representative of one or more static and/or dynamic memories, such as a dynamic random access memory (DRAM), a flash-based static memory, and the like. In this example, memory 1324 includes computer-executable components, which may be executed by one or more of the aforementioned processors of the electronic device 1300, including the neural network circuit 1307. The depicted components, and others not depicted, may be configured to perform various aspects of the methods described herein.

In some aspects, such as where the electronic device 1300 is a server device, various aspects may be omitted from the example depicted in FIG. 13, such as one or more of the multimedia processing block 1310, wireless connectivity processing block 1312, antenna(s) 1314, sensor processors 1316, ISPs 1318, or navigation processor 1320.

Example Clauses

In addition to the various aspects described above, specific combinations of aspects are within the scope of the disclosure, some of which are detailed in the clauses below:

Clause 1: A processing element (PE) circuit for machine learning, the PE circuit comprising: a first accumulator circuit, a flip-flop array having an input coupled to an output of the first accumulator circuit, a write register, and a first multiplexer having a first input coupled to an output of the write register, having a second input coupled to an output of the flip-flop array, and having an output coupled to a first input of the first accumulator circuit.

Clause 2: The PE circuit of Clause 1, further comprising a read register having an input coupled to the output of the flip-flop array. For certain aspects, the read register is configured to store data received from the flip-flop array.

Clause 3: The PE circuit of Clause 2, further comprising a write bus coupled to an output of the read register. For certain aspects, the read register is configured to write the stored data to the write bus. In some cases, the write bus may be configured to transfer the data to a memory.

Clause 4: The PE circuit of Clause 2 or 3, further comprising a read bus coupled to an input of the write register. For certain aspects, the read bus is configured to deliver data to the write register, and the write register may be configured to store the data.

Clause 5: A neural network circuit comprising a plurality of PE circuits, wherein at least one of the plurality of PE circuits comprises the PE circuit of any of Clause 4, the neural network circuit further comprising: a tightly coupled memory coupled to the write bus and to the read bus; and a global memory coupled to the read bus, wherein another one of the plurality of PE circuits has an output coupled to a second input of the first accumulator circuit. For certain aspects, the tightly coupled memory is configured to store first data from the read register delivered via the write bus and/or to write second data to the write register via the read bus. For certain aspects, the global memory is configured to store data received from the tightly coupled memory via the read bus. For certain aspects, the first accumulator circuit is configured to accumulate data received from the other one of the plurality of PE circuits and/or the first multiplexer.

Clause 6: The neural network circuit of Clause 5, wherein the other one of the plurality of PE circuits does not include a write register.

Clause 7: The PE circuit of any of Clauses 1-3, further comprising a read bus coupled to an input of the write register, wherein the read bus is configured to couple to at least one of a tightly coupled memory or a global memory, external to the PE circuit. For certain aspects, the read bus is configured to deliver data to the write register, and the write register may be configured to store the data.

Clause 8: The PE circuit of any of Clauses 1-3 and 7, further comprising: an adder circuit; and an accumulator-and-shifter circuit having an input coupled to an output of the adder circuit and having an output coupled to a second input of the first accumulator circuit.

Clause 9: The PE circuit of any of Clauses 1-3 and 7-8, further comprising: a second accumulator circuit; and a second multiplexer having a first input coupled to an output of the second accumulator circuit and having an output coupled to the first input of the first accumulator circuit.

Clause 10: The PE circuit of any of Clauses 1-3 and 7-9, wherein the PE circuit is a digital compute-in-memory (DCIM) PE circuit and wherein the PE circuit further comprises: a DCIM array; a bit-column adder tree circuit coupled to the DCIM array; and a weight-shift adder tree circuit coupled to the bit-column adder tree circuit.

Clause 11: The PE circuit of Clause 10, wherein the DCIM array comprises a plurality of compute-in-memory cells and wherein at least one of the compute-in-memory cells comprises an eight-transistor (8T) static random-access memory (SRAM) cell.

Clause 12: A neural network circuit comprising: a first set of cascaded processing element (PE) circuits, wherein an output of a first PE circuit in the first set is coupled to an input of a second PE circuit in the first set and wherein each PE circuit in the first set of cascaded PE circuits comprises: a multiply-and-accumulate (MAC) circuit, a local accumulator circuit having an input coupled to an output of the MAC circuit, and a set of flip-flops having an input coupled to an output of the local accumulator circuit; and a first global accumulator circuit having an input coupled to an output of the first set of cascaded PE circuits.

Clause 13: The neural network circuit of Clause 12, wherein each PE circuit in the first set of cascaded PE circuits is configured to concurrently perform a MAC operation with the MAC circuit and a shift operation with the set of flip-flops to shift a value from the PE circuit to a next PE circuit in the first set of cascaded PE circuits or to the first global accumulator circuit.

Clause 14: The neural network circuit of Clause 12 or 13, further comprising a memory, wherein: the first global accumulator circuit is configured to write partial sums to, and read the partial sums from, the memory; and the first set of cascaded PE circuits is not configured to write the partial sums to, or read the partial sums from, the memory.

Clause 15: The neural network circuit of any of Clauses 12-14, wherein the first global accumulator circuit comprises: a first accumulator, a flip-flop array having an input coupled to an output of the first accumulator, a write register, and a first multiplexer having a first input coupled to an output of the write register, having a second input coupled to an output of the flip-flop array, and having an output coupled to a first input of the first accumulator.

Clause 16: The neural network circuit of Clause 15, wherein the first global accumulator circuit further comprises a read register having an input coupled to the output of the flip-flop array.

Clause 17: The neural network circuit of Clause 16, further comprising a tightly coupled memory, wherein the first global accumulator circuit further comprises: a write bus coupled between an output of the read register and the tightly coupled memory; and a read bus coupled between the tightly coupled memory and an input of the write register.

Clause 18: The neural network circuit of Clause 17, further comprising a global memory coupled to the read bus of the first global accumulator circuit.

Clause 19: The neural network circuit of any of Clauses 12-18, wherein the first set of cascaded PE circuits is configured such that weights are loaded in parallel into the first set of cascaded PE circuits.

Clause 20: The neural network circuit of any of Clauses 12-19, wherein the first set of cascaded PE circuits comprises a number of cascaded PE circuits, such that the first global accumulator circuit is configured to receive a partial sum from the first PE circuit through all the PE circuits in the first set after a number of activation-input-bit cycles has occurred that matches the number of cascaded PE circuits.

Clause 21: The neural network circuit of any of Clauses 12-19, wherein: the first global accumulator circuit is configured to receive a partial sum from the first PE circuit through all the PE circuits in the first set after a number of activation-input-bit cycles has occurred; and a number of cascaded PE circuits in the first set is greater than or equal to the number of activation-input-bit cycles.

Clause 22: The neural network circuit of any of Clauses 12-21, wherein each PE circuit in the first set of cascaded PE circuits is a digital compute-in-memory (DCIM) PE circuit, wherein the MAC circuit in each PE circuit comprises a DCIM array, wherein the DCIM array comprises a plurality of compute-in-memory cells, and wherein at least one of the compute-in-memory cells comprises an eight-transistor (8T) static random-access memory (SRAM) cell.

Clause 23: The neural network circuit of any of Clauses 12-22, further comprising: a second set of cascaded PE circuits, wherein an output of a first PE circuit in the second set is coupled to an input of a second PE circuit in the second set and wherein each PE circuit in the second set of cascaded PE circuits comprises: a multiply-and-accumulate (MAC) circuit, a local accumulator circuit having an input coupled to an output of the MAC circuit, and a set of flip-flops having an input coupled to an output of the local accumulator circuit; a second global accumulator circuit having an input coupled to an output of the second set of cascaded PE circuits; a first copy-flop having an input coupled to an output of the first global accumulator circuit; a second copy-flop having a first input coupled to an output of the second global accumulator circuit and having a second input coupled to an output of the first copy-flop; and a super global accumulator circuit having an input coupled to an output of the second copy-flop.

Clause 24: A method of neural network processing, comprising: receiving, at a first input of a multiplexer, first data from a write register; receiving, at a second input of the multiplexer, second data from a flip-flop array; receiving, at an accumulator circuit, third data from a processing element (PE) circuit; selecting, with the multiplexer, data to output to the accumulator circuit between the first data and the second data; and accumulating, with the accumulator circuit, the selected output data from the multiplexer and the third data received from the PE circuit to generate accumulated data.

Clause 25: The method of Clause 24, further comprising: outputting the accumulated data to the flip-flop array; shifting, with the flip-flop array, the accumulated data to a read register; and writing the accumulated data from the read register to a tightly coupled memory (TCM) via a write bus.

Clause 26: The method of Clause 24, further comprising: outputting the accumulated data to the flip-flop array; shifting, with the flip-flop array, the accumulated data to a read register; processing the accumulated data from the read register with digital post-processing logic; and writing the processed, accumulated data to a tightly coupled memory (TCM) via a write bus coupled between the digital post-processing logic and the TCM.

Clause 27: A method of neural network processing, comprising: performing a multiply-and-accumulate (MAC) operation in each processing element (PE) circuit in a set of cascaded PE circuits, wherein an output of a first PE circuit in the set of cascaded PE circuits is coupled to an input of a second PE circuit in the set of cascaded PE circuits and wherein each PE circuit in the set of cascaded PE circuits comprises: a MAC circuit, a local accumulator circuit having an input coupled to an output of the MAC circuit, and a set of flip-flops having an input coupled to an output of the local accumulator circuit; performing a shifting operation with the set of flip-flops in each PE circuit to shift a value from the PE circuit to a next PE circuit in the set of cascaded PE circuits or to a global accumulator circuit, wherein in each PE circuit, the shifting operation is performed concurrently with the performance of the MAC operation; and accumulating, with the global accumulator circuit, the shifted values from a last PE circuit in the set of cascaded PE circuits to generate accumulated data.

Clause 28: The method of Clause 27, further comprising loading weights in parallel into the set of cascaded PE circuits before performing the MAC operation in each PE circuit with the weights.

Clause 29: The method of Clause 27 or 28, wherein the accumulating comprises: writing, with the global accumulator circuit, partial sums to a memory; and reading, with the global accumulator circuit, the partial sums from the memory, wherein the set of cascaded PE circuits does not write the partial sums to, or read the partial sums from, the memory.

Clause 30: The method of any of Clauses 27-29, wherein the accumulating comprises: receiving, at a first input of a multiplexer in the global accumulator circuit, first data from a write register in the global accumulator circuit; receiving, at a second input of the multiplexer, second data from a flip-flop array in the global accumulator circuit; receiving, at another accumulator circuit in the global accumulator circuit, third data from a last PE circuit in the set of cascaded PE circuits; selecting, with the multiplexer, data to output to the other accumulator circuit between the first data and the second data; and accumulating, with the other accumulator circuit, the selected output data from the multiplexer and the third data to generate the accumulated data.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing element (PE) circuit comprising:
   a first accumulator circuit;
   a flip-flop array having an input coupled to an output of the first accumulator circuit;
   a write register;

a first multiplexer having a first input coupled to an output of the write register, having a second input coupled to an output of the flip-flop array, and having an output coupled to a first input of the first accumulator circuit;

an adder circuit; and an accumulator-and-shifter circuit having an input coupled to an output of the adder circuit and having an output coupled to a second input of the first accumulator circuit.

2. The PE circuit of claim 1, further comprising a read register having an input coupled to the output of the flip-flop array.

3. The PE circuit of claim 2, further comprising a write bus coupled to an output of the read register.

4. The PE circuit of claim 3, further comprising a read bus coupled to an input of the write register.

5. A neural network circuit comprising a plurality of PE circuits, wherein at least one of the plurality of PE circuits comprises the PE circuit of claim 4, the neural network circuit further comprising:

a memory coupled to the write bus and to the read bus; and a global memory coupled to the read bus, wherein another one of the plurality of PE circuits has an output coupled to a second input of the first accumulator circuit.

6. The neural network circuit of claim 5, wherein the other one of the plurality of PE circuits does not include a write register.

7. The PE circuit of claim 1, further comprising a read bus coupled to an input of the write register, wherein the read bus is configured to couple to at least one of a tightly coupled memory or a global memory, external to the PE circuit.

8. The PE circuit of claim 1, further comprising:

a second accumulator circuit; and a second multiplexer having a first input coupled to an output of the second accumulator circuit and having an output coupled to the first input of the first accumulator circuit.

9. The PE circuit of claim 1, wherein the PE circuit is a digital compute-in-memory (DCIM) PE circuit and wherein the PE circuit further comprises:

a DCIM array;

a bit-column adder tree circuit coupled to the DCIM array; and a weight-shift adder tree circuit coupled to the bit-column adder tree circuit.

10. The PE circuit of claim 9, wherein the DCIM array comprises a plurality of compute-in-memory cells and wherein at least one of the compute-in-memory cells comprises an eight-transistor (8T) static random-access memory (SRAM) cell.

11. A method of neural network processing, comprising:

receiving, at a first input of a multiplexer, first data from a write register;

receiving, at a second input of the multiplexer, second data from a flip-flop array;

receiving, at an accumulator circuit, third data from a processing element (PE) circuit;

selecting, with the multiplexer, data to output to the accumulator circuit between the first data and the second data; and accumulating, with the accumulator circuit, the selected output data from the multiplexer and the third data received from the PE circuit to generate accumulated data, wherein the PE circuit comprises:

an adder circuit; and an accumulator-and-shifter circuit having an input coupled to an output of the adder circuit and having an output coupled to an input of the accumulator circuit.

12. The method of claim 11, further comprising:

outputting the accumulated data to the flip-flop array;

shifting, with the flip-flop array, the accumulated data to a read register; and writing the accumulated data from the read register to a memory via a write bus.

13. The method of claim 11, further comprising:

outputting the accumulated data to the flip-flop array;

shifting, with the flip-flop array, the accumulated data to a read register;

processing the accumulated data from the read register with digital post-processing logic; and writing the processed, accumulated data to a memory via a write bus coupled between the digital post-processing logic and the memory.

* * * * *